United States Patent
Nishihara

(10) Patent No.: US 9,055,244 B2
(45) Date of Patent: Jun. 9, 2015

(54) IMAGING DEVICE AND CAMERA SYSTEM WITH PHOTOSENSITIVE CONVERSION ELEMENT

(75) Inventor: Toshiyuki Nishihara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 13/241,758

(22) Filed: Sep. 23, 2011

(65) Prior Publication Data

US 2012/0081589 A1 Apr. 5, 2012

(30) Foreign Application Priority Data

Oct. 1, 2010 (JP) ................................. 2010-224235

(51) Int. Cl.
| | | |
|---|---|---|
| H04N 5/335 | (2011.01) | |
| H04N 3/14 | (2006.01) | |
| H04N 5/357 | (2011.01) | |
| H04N 5/32 | (2006.01) | |
| H04N 5/355 | (2011.01) | |

(52) U.S. Cl.
CPC ............ *H04N 5/357* (2013.01); *H04N 5/32* (2013.01); *H04N 5/3355* (2013.01); *H04N 5/355* (2013.01)

(58) Field of Classification Search
CPC ..... H04N 5/3355; H04N 5/357; H04N 5/355; H04N 5/378; H04N 5/3575; H04N 5/3745
USPC .................... 341/155; 348/296, 297, 208, 308
See application file for complete search history.

(56) References Cited

U.S. PATENT DOCUMENTS

| | | | |
|---|---|---|---|
| 2002/0196170 A1 | 12/2002 | McIlrath | |
| 2003/0206236 A1 | 11/2003 | Levantovsky | |
| 2009/0174802 A1* | 7/2009 | Vogel et al. .................... | 348/308 |
| 2012/0280131 A1* | 11/2012 | Spartiotis et al. ............. | 250/366 |

FOREIGN PATENT DOCUMENTS

| | | |
|---|---|---|
| CN | 101521246 | 9/2009 |
| EP | 0 205 624 | 12/1986 |
| EP | 2302905 A1 | 3/2011 |

(Continued)

OTHER PUBLICATIONS

European Search Report issued on Jul. 27, 2012, in connection with counterpart EP Application No. 10 17 9238.

(Continued)

*Primary Examiner* — Twyler Haskins
*Assistant Examiner* — Padma Haliyur
(74) *Attorney, Agent, or Firm* — Dentons US LLP

(57) ABSTRACT

An imaging device includes: a pixel array section functioning as a light receiving section which includes photoelectric conversion devices and in which a plurality of pixels, which output electric signals when photons are incident, are disposed in an array; a sensing circuit section in which a plurality of sensing circuits, which receive the electric signals from the pixels and perform binary determination regarding whether or not there is an incidence of photons on the pixels in a predetermined period, are arrayed; and a determination result integration circuit section having a function of integrating a plurality of determination results of the sensing circuits for the respective pixels or for each pixel group, wherein the determination result integration circuit section derives the amount of photon incidence on the light receiving section by performing photon counting for integrating the plurality of determination results in the plurality of pixels.

12 Claims, 16 Drawing Sheets

(56) References Cited

FOREIGN PATENT DOCUMENTS

| | | |
|---|---|---|
| JP | 07-067043 | 3/1995 |
| JP | 07-311271 | 11/1995 |
| JP | 2004-193675 | 7/2004 |
| JP | 2008-141610 | 6/2008 |
| JP | 2008-259228 | 10/2008 |
| JP | 2008-538606 | 10/2008 |
| JP | 2009-038834 | 2/2009 |
| JP | 2009-206709 | 9/2009 |
| WO | 2004099865 A2 | 11/2004 |

OTHER PUBLICATIONS

Extended European Search Report for EP Application No. EP 11 007277 dated Nov. 13, 2012.

Japanese Examination Report issued in connection with related Japanese Patent Application No. 2010-224235 dated Mar. 4, 2014.

Chinese Office Examination Report issued in connection with related Chinese patent application No. CN 201010290397.4 dated Feb. 16, 2015.

* cited by examiner

FIG.6
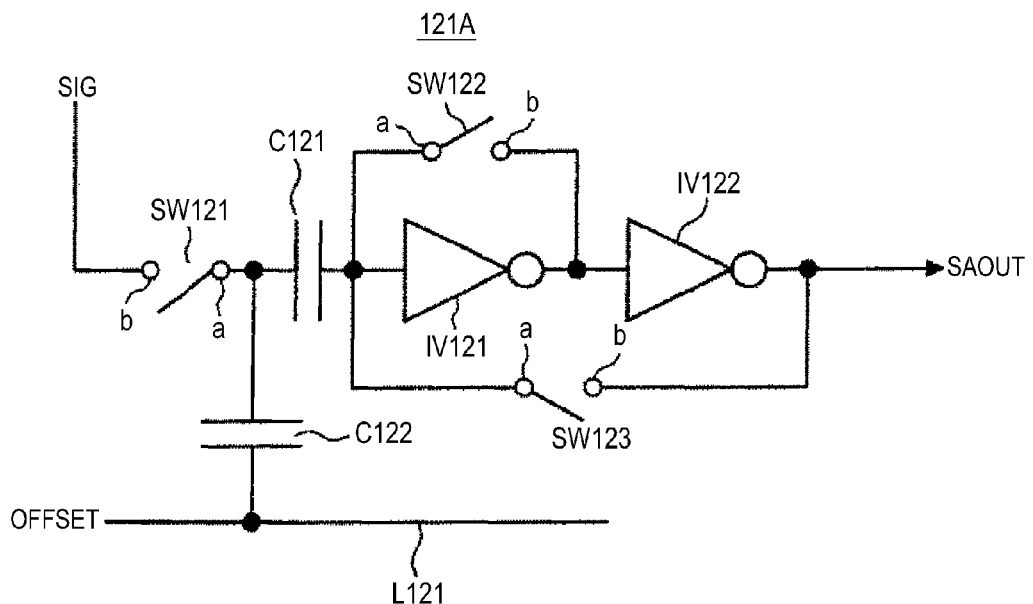
FIG.7A  RESET (182)
FIG.7B  READ (181)
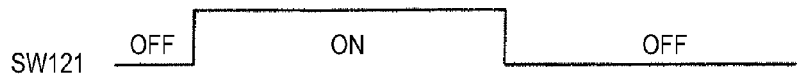
FIG.7C  SW121   OFF | ON | OFF
FIG.7D  SW122   OFF | ON | OFF
FIG.7E  SW123   OFF | ON
FIG.7F  OFFSET

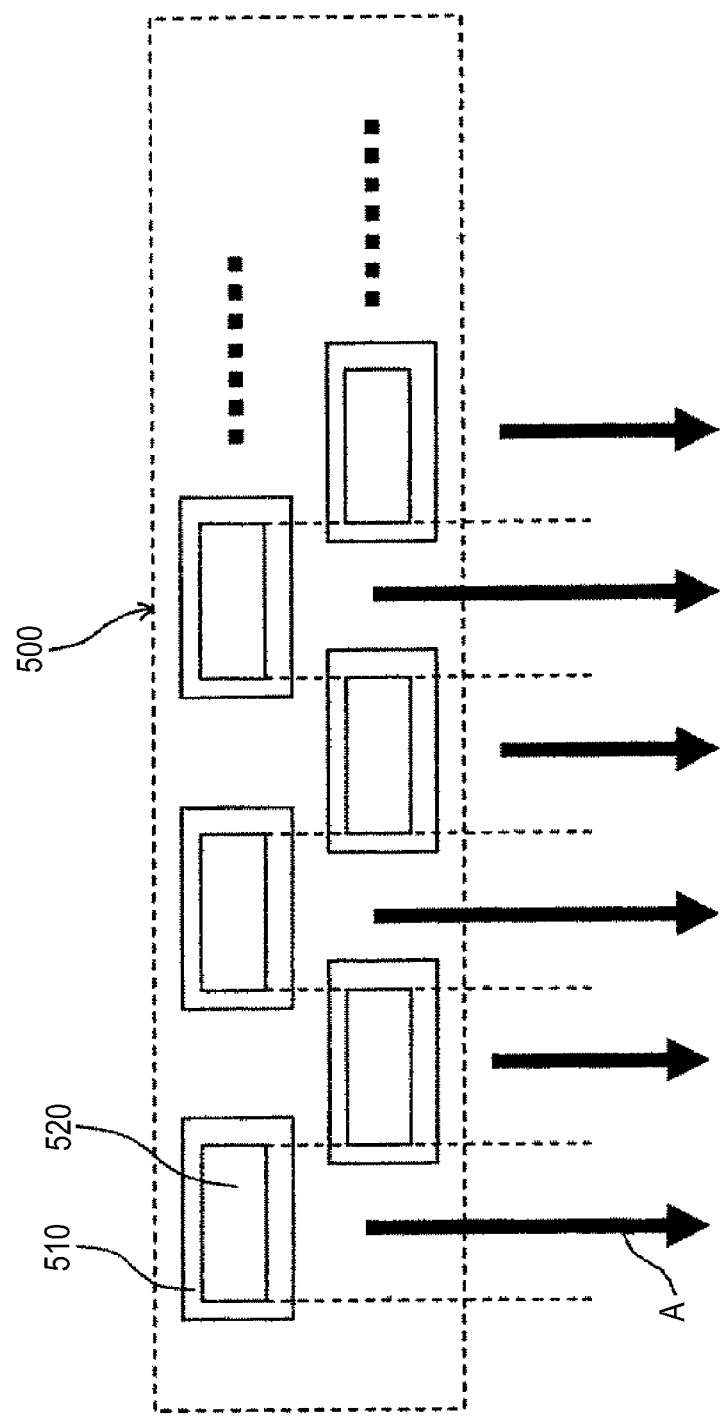

imaging device and camera system with photosensitive conversion element

FIELD

The present disclosure relates to an imaging device, such as a CMOS image sensor, and a camera system.

BACKGROUND

Measurement or imaging of minute luminescence or fluorescence emitted from the body has become increasingly active in the field of medicine or biotechnology in recent years.

In the medical or security field, a technique of converting a small quantity of X-rays transmitted through the body into visible-level photons through a scintillator and detecting them to perform a transmission imaging has been industrialized. In addition, in the medical or security field, a technique (for example, a SPECT or a PET) of converting γ-rays generated from a small quantity of radiation material injected into the human body into photons through a scintillator has been industrialized.

In imaging in such a field, a photon counter is used for a very small amount of light.

Typically, a photon counter is a single device using an avalanche diode or a photomultiplier tube.

This photon counter generates a voltage pulse at the output by converting photons incident on the light receiving surface into photoelectrons, accelerating the photoelectrons with a high voltage, and multiplying them by generation of secondary electrons by collision.

The number of pulses is measured by a counter device connected to the device all the time.

While the photon counter has high measurement accuracy allowing detection in units of one photon, the system is expensive and the dynamic range for measurement is also narrow.

Usually, the number of photons which can be measured by one photon counter is about 1 million to 10 million for 1 second.

On the other hand, for imaging in a range of a relatively large amount of light to be measured, a photodiode and an analog-to-digital (AD) converter are used.

The photodiode accumulates electrode charges photoelectrically converted and outputs an analog signal. This analog signal is converted into a digital signal by the AD converter.

Problems in such imaging are noise caused by transmission of an analog signal and the conversion rate of the AD converter.

In order to detect a small amount of light, it is necessary to suppress noise and also to increase the number of bits in AD conversion for fine chopping. However, in order to do so, a very high-speed AD converter is necessary. In addition, if this is made to have a large number of pixels in order to improve the resolution in imaging, the system size for AD conversion is significantly increased.

SUMMARY

Basically, both low-noise and high-accuracy optical detection and a large dynamic range are necessary for imaging of a small amount of light.

However, there is no device which meets both the requirements.

For example, in order to reduce the amount of exposure in X-ray imaging, the accuracy equivalent to the level of a photon counter is necessary. In a normal photon counter, however, it is not possible to obtain a dynamic range sufficient for imaging.

In addition, a large number of pixels are necessary in order to improve the resolution. In this case, however, the system including a counter device is very expensive.

On the other hand, JP-A-1995-67043 proposes a new photon counting method using time division.

This is to acquire the two-dimensional imaging data by performing binary determination regarding whether or not there is an incidence of a photon on a photodiode in a fixed period and integrating results obtained by repeating the binary determination multiple times.

That is, a signal from a photodiode is sensed every fixed period, and a counter connected to each pixel is counted up by 1 regardless of the number of incident photons if the number of photons incident for the period is 1 or more.

If the frequency of photon incidence is random on the time axis, the relationship between the actual number of photon incidence and the number of counts follows a Poisson distribution. Accordingly, it becomes an approximately linear relationship if the incidence frequency is low, and uniform correction can be performed if the incidence frequency is high.

However, according to the technique disclosed in JP-A-1995-67043, the aperture area of a pixel is extremely reduced since a sensing circuit and a counter are necessary for each pixel.

JP-A-2004-193675 proposes a configuration in which counters are disposed outside a pixel array while adopting the above-described time-division counting method. However, a sensing circuit and a memory are still necessary for each pixel.

A counter is provided for each pixel even if the counter is provided outside the pixel array. Accordingly, the circuit size of a chip is inevitably increased.

Moreover, in order to increase the dynamic range in imaging in the configuration disclosed in JP-A-1995-67043 or JP-A-2004-193675, it is necessary to chop a measurement period of photon incidence finely on the time axis and to increase the pixel access speed.

Thus, it is desirable to provide an imaging device and a camera system allowing imaging or light intensity measurement with less noise even at low illuminance and with a wide dynamic range.

An embodiment of the present disclosure is directed to an imaging device including: a pixel array section functioning as a light receiving section which includes photoelectric conversion devices and in which a plurality of pixels, which output electric signals when photons are incident, are disposed in an array; a sensing circuit section in which a plurality of sensing circuits, which receive the electric signals from the pixels and perform binary determination regarding whether or not there is an incidence of photons on the pixels in a predetermined period, are arrayed; and a determination result integration circuit section having a function of integrating a plurality of determination results of the sensing circuits for the respective pixels or for each pixel group. The determination result integration circuit section derives the amount of photon incidence on the light receiving section by performing photon counting for integrating the plurality of determination results in the plurality of pixels.

Another embodiment of the present disclosure is directed to a camera system including: an imaging device; an optical system which forms a subject image on the imaging device; and a signal processing circuit which processes an output image signal of the imaging device. The imaging device includes: a pixel array section functioning as a light receiving section which includes photoelectric conversion devices and in which a plurality of pixels, which output electric signals when photons are incident, are disposed in an array; a sensing circuit section in which a plurality of sensing circuits, which receive the electric signals from the pixels and perform binary determination regarding whether or not there is an incidence of photons on the pixels in a predetermined period, are arrayed; and a determination result integration circuit section having a function of integrating a plurality of determination results of the sensing circuits for the respective pixels or for each pixel group. The determination result integration circuit section derives the amount of photon incidence on the light receiving section by performing photon counting for integrating the plurality of determination results in the plurality of pixels.

According to the embodiments of the present disclosure, it is possible to enable imaging or light intensity measurement with less noise even at low illuminance and with a wide dynamic range by making an analog signal unnecessary without reducing the aperture ratio of a pixel.

BRIEF DESCRIPTION OF THE DRAWINGS

FIG. 6 is a circuit diagram showing an example of a sensing circuit having a self-reference function;

FIGS. 7A to 7F are timing charts for explaining an example of a read operation using the sensing circuit having a self-reference function, which is shown in FIG. 6, in the example of the pixel in FIG. 4;

FIG. 10 is a view showing an example of a linear imaging apparatus in which the imaging devices (light receiving devices) according to the embodiment of the present disclosure are arrayed in a one-dimensional linear shape;

DETAILED DESCRIPTION OF THE PREFERRED EMBODIMENTS

Figure 1:
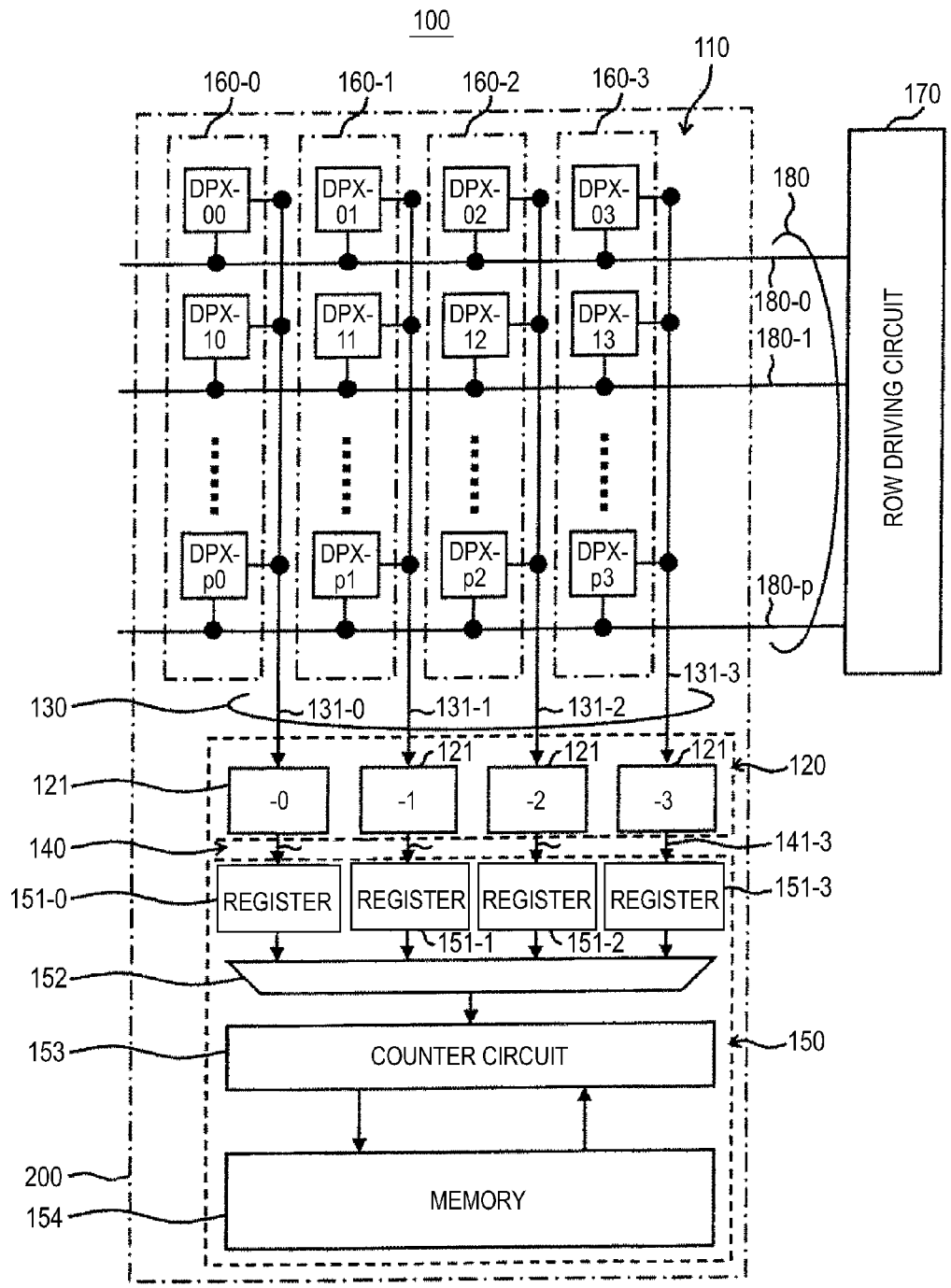
FIG. 1 is a view showing an example of the configuration of a CMOS image sensor (imaging device) according to a first embodiment of the present disclosure.

Hereinafter, embodiments of the present disclosure will be described with reference to the accompanying drawings.

In addition, the explanation will be given in following order.

1. Outline of features of an imaging device of the present embodiment

2. First embodiment (first exemplary configuration of an imaging device)

3. Second embodiment (second exemplary configuration of an imaging device)

4. Third embodiment (application example of an imaging device

5. Fourth embodiment (third exemplary configuration of an imaging device)

6. Fifth embodiment (fourth exemplary configuration of an imaging device)

7. Sixth embodiment (camera system)

1. Outline of Features of an Imaging Device of the Present Embodiment

In the present embodiment, an optimal configuration of an imaging device (CMOS image sensor) as a full digital image sensor using photon counting is realized in the field of high-speed parallel reading.

First, each pixel outputs the incidence of a photon within a specific period as an electric signal. A sensing circuit receives the result multiple times within 1 frame period and performs determination based on the binary value. The imaging device generates gray-scale data by integration for each pixel, for example.

The imaging device according to the present embodiment has the following characteristics based on such a basic configuration.

Time-division photon counting makes it unnecessary to continuously monitor the generation of a pulse by incidence of a photon in a system by changing the photon detection process to repetitive detection in a fixed cycle.

Focusing on this, in the present embodiment, first, the configuration in which each pixel has a separate sensing circuit and a separate counter is not adopted and the three components are hierarchized.

That is, in the present embodiment, a plurality of pixels share one sensing circuit or a plurality of sensing circuits share one counting circuit given the time-division photon counting.

In the present embodiment, for example, a plurality of pixels which share a sensing circuit are read cyclically and exposure is executed for a period from last reading to current reading. Accordingly, the above-described sharing does not have an adverse influence on the exposure time.

In addition, it is also possible to start the next exposure while count processing of determination results and processing for storing the data on a memory are being executed. Therefore, although time taken for the count processing increases as a plurality of sensing circuits share a counter, this does not have an adverse influence on the exposure time.

In addition, in the present embodiment, the dynamic range of photon counting is expanded by adding count results of a plurality of pixels.

Addition between pixels which share a counter can be executed very easily by storing the results of different pixels at the same address of a memory.

In addition, a function of deriving the total amount of incident light by adding all count results of the light receiving section is set. For example, it can be easily realized by providing an additional adder near a data output section.

In addition, by providing such light receiving devices as unit pixels linearly or in an array, it is possible to detect a very small amount of light and to perform imaging with a wide dynamic range.

According to the present embodiment adopting the configuration described above, it is possible to significantly reduce the circuit size necessary for photon counting. Therefore, using the miniaturization technology for a semiconductor imaging device, high-performance photon counting using a plurality of pixels can be executed.

The dynamic range of photon counting is determined by the total number of meshes using both multi-division in a time direction and multi-division of the incidence surface, and each mesh has a binary value.

The resolution of meshes and the dynamic range of the number of counts increase with the development of both miniaturization technology in semiconductor manufacturing and an improvement in the speed.

Although accurate light intensity detection or accurate imaging is possible with only one imaging device according to the present embodiment, accurate imaging with a wider dynamic range becomes possible by arraying the plurality of imaging devices according to the present embodiment as unit light receiving devices.

Since each light receiving device has a counting function, such a system can be built easily without using an expensive external device.

In addition, since each light receiving device performs full digital counting which is directly related to the number of incident photons itself, a sensitivity variation between light receiving devices observed in a typical analog imaging device hardly exists. That is, sensitivity adjustment between light receiving devices is not necessary.

For example, if the imaging device according to the present embodiment is used together with a scintillator for transmission imaging using a small quantity of X-rays, high-precision and high-resolution imaging can be executed with the low exposure, and the cost of the system is very low.

Hereinafter, a CMOS image sensor which is an imaging device according to the present embodiment having the above characteristics will be described in detail.

2. First Embodiment

FIG. 1 is a view showing an example of the configuration of a CMOS image sensor (imaging device) according to a first embodiment of the present disclosure.

[Outline of the Overall Configuration]

A CMOS image sensor 100 includes a pixel array section 110, a sensing circuit section 120, an output signal line group 130, a transfer line group 140, and a determination result integration circuit section 150.

In the CMOS image sensor 100, a plurality of pixels share one sensing circuit, as will be described later.

Corresponding to this, the CMOS image sensor 100 includes pixel blocks 160-0 to 160-3, . . . , each of which includes a plurality of pixels DPX on the same column, and a selection circuit.

In addition, the CMOS image sensor 100 includes a row control line group 180 and a row driving circuit 170 for driving the pixel DPX of the pixel array section 110 to output an electric signal of the pixel DPX to an output signal line 131.

In the pixel array section 110, a plurality of digital pixels DPX are arrayed in a matrix in the row and column directions.

Each digital pixel DPX has a photoelectric conversion device, and has a function of outputting an electric signal when a photon is incident.

Moreover, as described above, each of the pixel blocks 160-0 to 160-3, . . . is formed by the plurality of pixels DPX on the same column and a selection circuit.

The CMOS image sensor 100 has a circuit block 200 which generates two-dimensional imaging data with gradation, for example, by determining a binary value of an electric signal transmitted through the output signal line 131 for a fixed period, integrating the determination result multiples times for each pixel, and adding the count results of a plurality of pixels.

The CMOS image sensor 100 derives the amount of photon incidence on the pixel array section 110, which is a light receiving section, by integrating the determination results obtained multiple times for a plurality of pixels, in the present embodiment, for a plurality of pixels in units of the pixel blocks 160-0 to 160-3, . . . .

The CMOS image sensor 100 has a function of expanding the dynamic range of photon counting by adding the count results of a plurality of pixels.

The pixel array section 110, the sensing circuit section 120, and the determination result integration circuit section 150 are disposed in the circuit block 200.

In the sensing circuit section 120, sensing circuits 121-0, 121-1, 121-2, 121-3, . . . are arrayed corresponding to the pixel blocks 160-0 to 160-3, . . . of the pixel array section 110, respectively.

An input of the sensing circuit 121-0 is connected to an output signal line 131-0 to which outputs of all pixels DPX-00, DPX-10, . . . , and DPX-p0, which form the pixel block 160-0, are connected in common.

That is, the plurality of pixels DPX-00 to DPX-p0 shares the one sensing circuit 121-0.

In addition, the number of pixels in each pixel block 160 (160-0 to 160-3) is set to 128, for example. In this case, p is 0 to 127, and the pixel block 160-0 includes pixels DPX-00 to DPX1270.

An input of the sensing circuit 121-1 is connected to an output signal line 131-1 to which outputs of all pixels DPX-01, DPX-11, . . . , and DPX-p1, which form the pixel block 160-1, are connected in common.

That is, the plurality of pixels DPX-01 to DPX-p1 shares the one sensing circuit 121-1.

The pixel block 160-1 includes 128 pixels DPX-01 to DPX1271, for example.

An input of the sensing circuit 121-2 is connected to an output signal line 131-2 to which outputs of all pixels DPX-02, DPX-12, ..., DPX-p2, which form the pixel block 160-2, are connected in common.

That is, the plurality of pixels DPX-02 to DPX-p2 share the one sensing circuit 121-2.

The pixel block 160-2 includes 128 pixels DPX-02 to DPX1272, for example.

An input of the sensing circuit 121-3 is connected to an output signal line 131-3 to which outputs of all pixels DPX-03, DPX-13, ..., DPX-p3, which form the pixel block 160-3, are connected in common.

That is, the plurality of pixels DPX-03 to DPX-p3 share the one sensing circuit 121-3.

The pixel block 160-3 includes 128 pixels DPX-03 to DPX1273, for example.

In the sensing circuit section 120, also for other pixel blocks (not shown), sensing circuits are arrayed so as to be shared by a plurality of pixels.

The determination result integration circuit section 150 has a function of generating two-dimensional imaging data with gradation, for example, by integrating determination results of the sensing circuits 121-0 to 121-3 multiples times for each pixel and adding the count results of the plurality of pixels.

The determination result integration circuit section 150 has a function of deriving the amount of photon incidence on the pixel array section 110, which is a light receiving section, by integrating the determination results obtained multiple times for a plurality of pixels, in the present embodiment, for a plurality of pixels in units of the pixel blocks 160-0 to 160-3, . . . .

The determination result integration circuit section 150 has registers 151-0 to 151-3, a selection circuit 152, a counting circuit 153, and a memory 154.

The registers 151-0 to 151-3 holds determination values of the corresponding sensing circuits 121-0 to 121-3 transmitted through transfer lines 141-0 to 141-3.

The selection circuit 152 selects outputs of the registers 151-0 to 151-3 sequentially to supply the determination values, which are held in the respective registers 151-0 to 151-3, to the counting circuit 153.

The counting circuit 153 performs count processing on the determination values of a plurality of pixels (4 pixels in this example), which are selected by the selection circuit 152 after being read by row selection, and stores the count result for each pixel in the memory 154.

Then, the counting circuit 153 adds the count results of a plurality of pixels and stores the addition result in the memory 154.

Pixel data at the time of last reading is loaded from the memory 154 to the counting circuit 153.

In the first embodiment, the determination result integration circuit section 150 includes one counting circuit 153, and the plurality of registers 151-0 to 151-3 share the counting circuit 153.

In other words, the CMOS image sensor 100 according to the first embodiment shares the counting circuit 153 among the plurality of sensing circuits 121-0 to 121-3.

The CMOS image sensor 100 according to the present embodiment is configured to have the above-described characteristic configuration.

That is, the CMOS image sensor 100 is configured to share a sensing circuit between a plurality of pixels for cyclic access, so that exposure time can be secured and it can meet a small pixel.

In addition, since a plurality of sensing circuits share a counting circuit, it is possible to form the CMOS image sensor 100 with optimal circuit size and processing speed.

The CMOS image sensor 100 has a function of expanding the dynamic range of photon counting by adding the count results of a plurality of pixels.

Here, the basic concepts of light reception and photon counting of a light receiving section 300, which is formed by the pixel array section 110 in the circuit block 200 of the CMOS image sensor 100 according to the present embodiment, will be described with reference to FIGS. 2 and 3.

Figure 2:
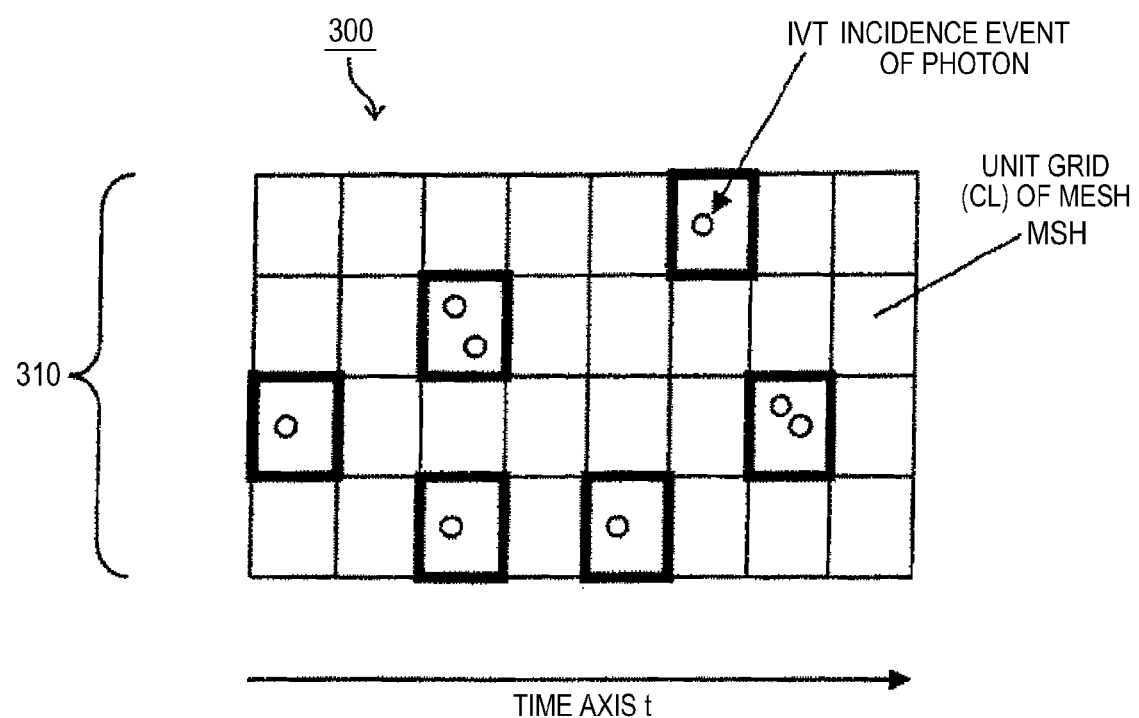
FIG. 2 is a conceptual view showing a light receiving section in the present embodiment.

FIG. 2 is a conceptual view showing the light receiving section 300 in the present embodiment.

Figure 3:
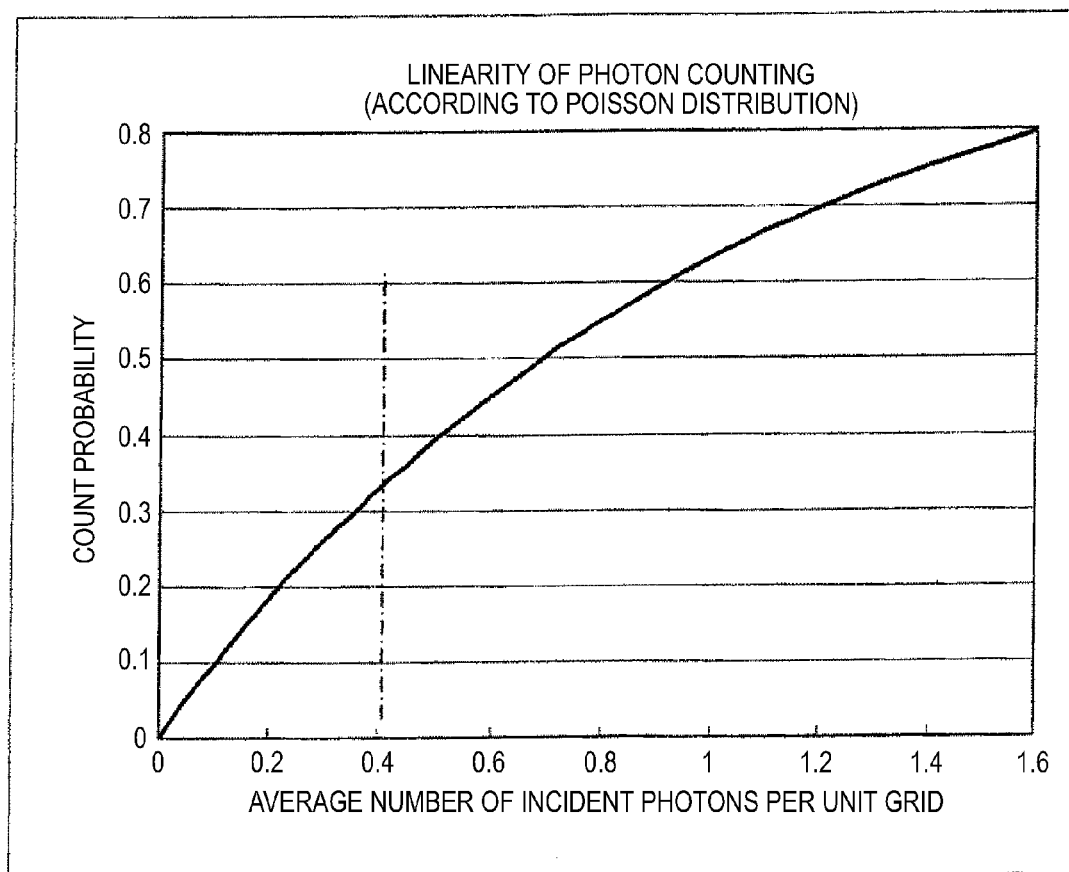
FIG. 3 is a view showing the relationship between the average number of times of incidence of photons on a unit grid of a mesh of the light receiving section, which is shown in FIG. 2, and the average number of counts.

FIG. 3 is a view showing the relationship between the average number of times of incidence of photons on a unit grid of a mesh of the light receiving section, which is shown in FIG. 2, and the average number of counts.

In addition, in FIG. 2, the originally two-dimensional light receiving surface is expressed in a one-dimension manner for the sake of simplicity.

The photon counting is executed by forming three-dimensional meshes MSH in the light receiving section 300 using a light receiving surface 310 divided at equal distances and a time axis t divided at equal distances (expressed in a two-dimensional manner in FIG. 2).

Each mesh MSH has a binary value. That is, the sensing circuit section 120 determines whether or not one or more photons are incident on each mesh MSH. In this case, for example, "1" is determined regardless of the number of incident photons if there is an incidence and "0" is determined if there is no incidence. In FIG. 2, a mesh block corresponding to "1" is displayed with a thick frame. In addition, the reference numeral IVT in FIG. 2 indicates an incidence event of a photon.

In addition, the total number of "1" is counted by the determination result integration circuit section 150 and is then stored in the memory 154.

Here, assuming that photons are incident appropriately uniformly with respect to the time axis t while fluctuating and are also incident appropriately uniformly in the surface direction, the relationship between the total number of counts and the actual number of incident photons follows the Poisson distribution.

FIG. 3 is a view showing the relationship between the average number of times of incidence of photons on a unit grid CL of a mesh and the average number of counts.

As shown in FIG. 3, the number of times of incidence is substantially equal to the number of counts in a fine light region where the average number of times of incidence is 0.1 times or less.

In addition, if the average number of times of incidence is 0.4 times or less, the relationship between the number of times of incidence and the number of counts is approximately linear.

That is, if the total number of grids of the mesh MSH is sufficiently larger than the number of incident photons, the count value reflects the number of incident photons linearly, and highly precise counting is possible accordingly.

In addition, it is possible to improve the accuracy of counting while expanding the dynamic range by narrowing the mesh spacing in the surface direction or on the time axis t to increase the total number of grids.

That is, using high-speed circuit technology and miniaturization technology in semiconductor manufacturing, it is possible to improve the accuracy of photon measurement and expand the dynamic range significantly in the light receiving section 300.

In addition, the following configuration is effective when the incidence of light in the surface direction is largely biased locally and the amount of incident light is relatively large.

The measurement accuracy can be improved by dividing a surface direction mesh into a plurality of groups formed by one or more grid blocks, calculating the average number of counts of the grids CL for each group, and performing correction according to the Poisson distribution.

Alternatively, it is also effective to ease the deviation of incident photons in the surface direction by disposing an optical low pass filter before the light receiving surface 310. Moreover, in the case of X-ray detection using a scintillator, the scintillator itself serves as an optical low pass filter since light is emitted from the scintillator while scattering when an X-ray is incident.

[Function Related to a Digital Pixel]

Here, an example of the configuration of the digital pixel DPX will be described.

As described above, the digital pixel (hereinafter, simply referred to as a pixel) DPX has a photoelectric conversion device and outputs an electric signal when a photon is incident.

Since the CMOS image sensor 100 as an imaging device has a reset function and a read function for the pixel DPX, it is possible to execute resetting and reading at arbitrary timing.

The resetting refers to resetting the pixel DPX to the state where a photon is not incident. Preferably, each pixel DPX includes a lens on the light receiving surface, or may further include a color filter on the light receiving surface when necessary.

Although such a basic function of a pixel is close to that of a normal pixel, the accuracy or linearity as an analog value is not necessary for the output.

Here, an example of the configuration of a digital pixel will be described.

Figure 4:
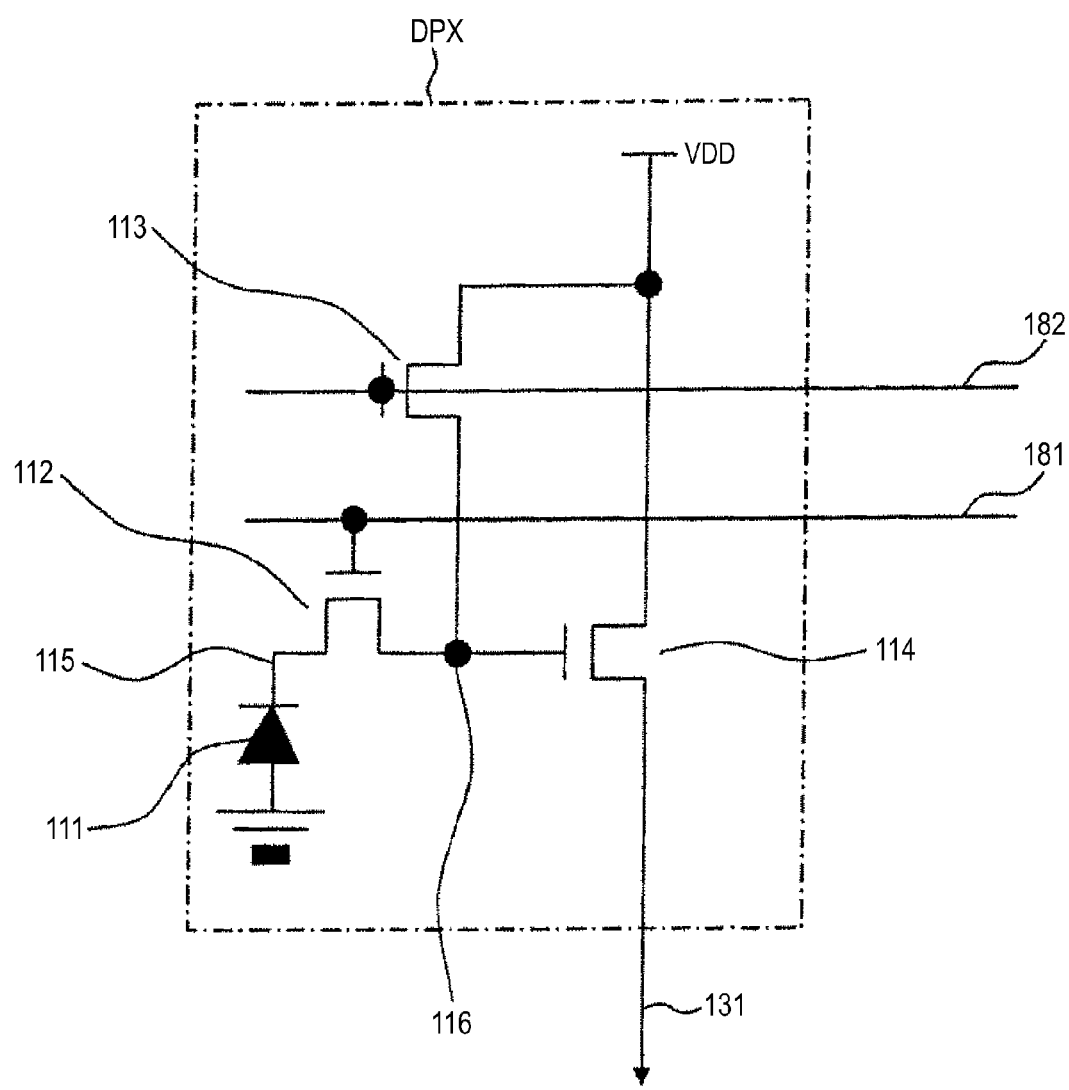
FIG. 4 is a view showing an example of the circuit configuration of a pixel in the present embodiment.

FIG. 4 is a view showing an example of the circuit configuration of a pixel in the present embodiment.

FIG. 4 shows an example of a pixel circuit including three transistors in one unit pixel DPX.

The one unit pixel DPX includes a photodiode 111, a transfer transistor 112, a reset transistor 113, an amplifier transistor 114, an accumulation node 115, and a floating diffusion (FD) node 116.

A gate electrode of the transfer transistor 112 is connected to a transfer line 181 serving as a row control line, and a gate electrode of the reset transistor 113 is connected to a reset line 182 serving as a row control line.

A gate electrode of the amplifier transistor 114 is connected to the FD node 116, and a source electrode of the amplifier transistor 114 is connected to the output signal line 131.

In the pixel DPX, a pair of electron and hole are generated by light incident on a silicon substrate of the pixel, and electrons are accumulated at the accumulation node 115 by the photodiode 111.

These are transmitted to the FD node 116 by turning on the transfer transistor 112 at predetermined timing, thereby driving the gate of the amplifier transistor 114.

As a result, a signal charge is read as a signal to the output signal line 131.

The output signal line 131 may be grounded through a constant current source or a resistive device for a source-follower operation, or may be grounded before reading and then have a floating state so that the charge level based on the amplifier transistor 114 is output.

The reset transistor 113 resets a pixel to the dark state before accumulation, that is, to the state where a photon is not incident by extracting electrons accumulated in the photodiode 111 when turned on simultaneously with the transfer transistor 112.

Such a circuit or an operation mechanism of a pixel is the same as that of an analog pixel, and various kinds of variations may occur similar to the analog pixel.

However, a digital pixel outputs the incidence of one photon in a digital manner while an analog pixel outputs the total incidence amount of a plurality of photons in an analog manner.

Accordingly, the digital pixel and the analog pixel are differently designed.

First, in the case of a digital pixel, it is necessary to generate a sufficiently large electric signal for the incidence of one photon.

For example, in the pixel circuit with an amplifier transistor shown in FIG. 4, it is preferable that the parasitic capacitance of the FD node 116, which is an input node of the amplifier transistor 114 which forms a source follower, be set as small as possible.

Also in this case, it is preferable that the amplitude of an output signal with respect to the incidence of one photon be kept sufficiently larger than that of random noise of the amplifier transistor 114.

On the other hand, since it is not necessary to consider the linearity, the accuracy, or the operation range in an output signal from a pixel unlike an analog pixel, the same low voltage as for the digital circuit can be used for an I/O power source of a source follower, for example. Moreover, the accumulated charge capacity of a photodiode is preferably set to be as small as possible.

Next, the outline of the overall operation of the CMOS image sensor 100 according to the first embodiment will be described.

As described above, the pixel block 160 (160-0 to 160-3, . . . ) includes 128 digital pixels DPX and a selection circuit. The selection circuit selects one of the pixels to execute resetting or reading.

In this example, one pixel in the pixel block 160 is selected according to the row control lines 181 and 182 driven by the row driving circuit 170.

At the time of reading, whether or not there is an incidence of a photon on the selected pixel is output as an electric signal to the output signal line 131 (131-0 to 131-3, . . . ) and the binary value is determined by the sensing circuit 121 (121-0 to 121-3).

For example, the sensing circuit 121 (121-0 to 121-3) determines "1" as a determination value if light is incident on the selected pixel and determines "0" as a determination value if light is not incident on the selected pixel and latches the determination value.

The determination value of the sensing circuit 121 (121-0 to 121-3) is first transmitted to the register 151 (151-0 to 151-3).

The counting circuit 153 is shared by the four pixel blocks 160-0 to 160-3, and count processing on four pixels read by row selection is executed sequentially through the selection circuit 152.

In addition, the count result for each pixel is stored in the memory 154.

That is, pixel data at the time of last reading is first loaded from the memory 154 to the counting circuit 153.

In this case, the counting circuit 153 adds "1" to the count value if "1" is stored in the register 151 (151-0 to 151-3) and does not update the count value if "0" is stored.

Then, the value of the counting circuit 153 is returned to the memory 154, and the count processing for one pixel is completed. This processing is executed sequentially for four pixels.

While such count processing is being executed, the pixel block 160 (160-0 to 160-3) and the sensing circuit 121 (121-0 to 121-3) can execute reading and determination of the next row in parallel.

For example, such digital reading is executed 1023 times in one frame period to form 10-bit gray-scale data for each pixel.

In this case, the counting circuit 153 is 10 bits, and the memory 154 is 5120 bits since each of "128×4" pixels has 10-bit data.

That is, the CMOS image sensor 100 operates as a photon counter arrayed with a unique configuration.

Incidentally, the size of the counting circuit 153 or the memory 154 changes with applications.

For example, when forming an imaging unit with "4 pixels wide×4 pixels long", data of pixels included in each imaging unit is stored in the same address of the memory 154.

Then, the count value of the incidence of photons on the 16 pixels is added in the counting circuit 153 through the memory.

In this case, the total number of counts becomes 16 times, and 14 bits is necessary for the counting circuit 153.

On the other hand, the number of addresses in the memory 154 is set to 32/(1/16), and each stores a 14-bit value. Accordingly, the necessary capacity is 448 bits.

Alternatively, where counting only the total number of photon incidences on the entire light receiving surface, it is not necessarily to provide a memory since the data is held in the counting circuit 153.

In this case, 19 bits corresponding to 10-bit counts for 512 pixels are necessary for the number of bits in a counter.

Alternatively, when changing a function from two-dimensional imaging of all pixels to totaling according to applications, 14 bits are set for the counting circuit 153 and the 14-bit memory 154 is prepared for "128×4" pixels. In addition, the level of the circuit block 200 is set to meet "4×4" addition.

For addition of all pixels, it is preferable to execute the "4×4" addition by the circuit block 200 first, to prepare a separate adder in an output circuit, and to calculate the total by adding a plurality of output values from the memory 154. In this case, since the throughput of an adder of an output unit is 1/16 of that in the case where there is no prior addition, high-speed processing is not necessary.

Next, cyclic access of pixel blocks in the first embodiment will be described.

Figure 5:
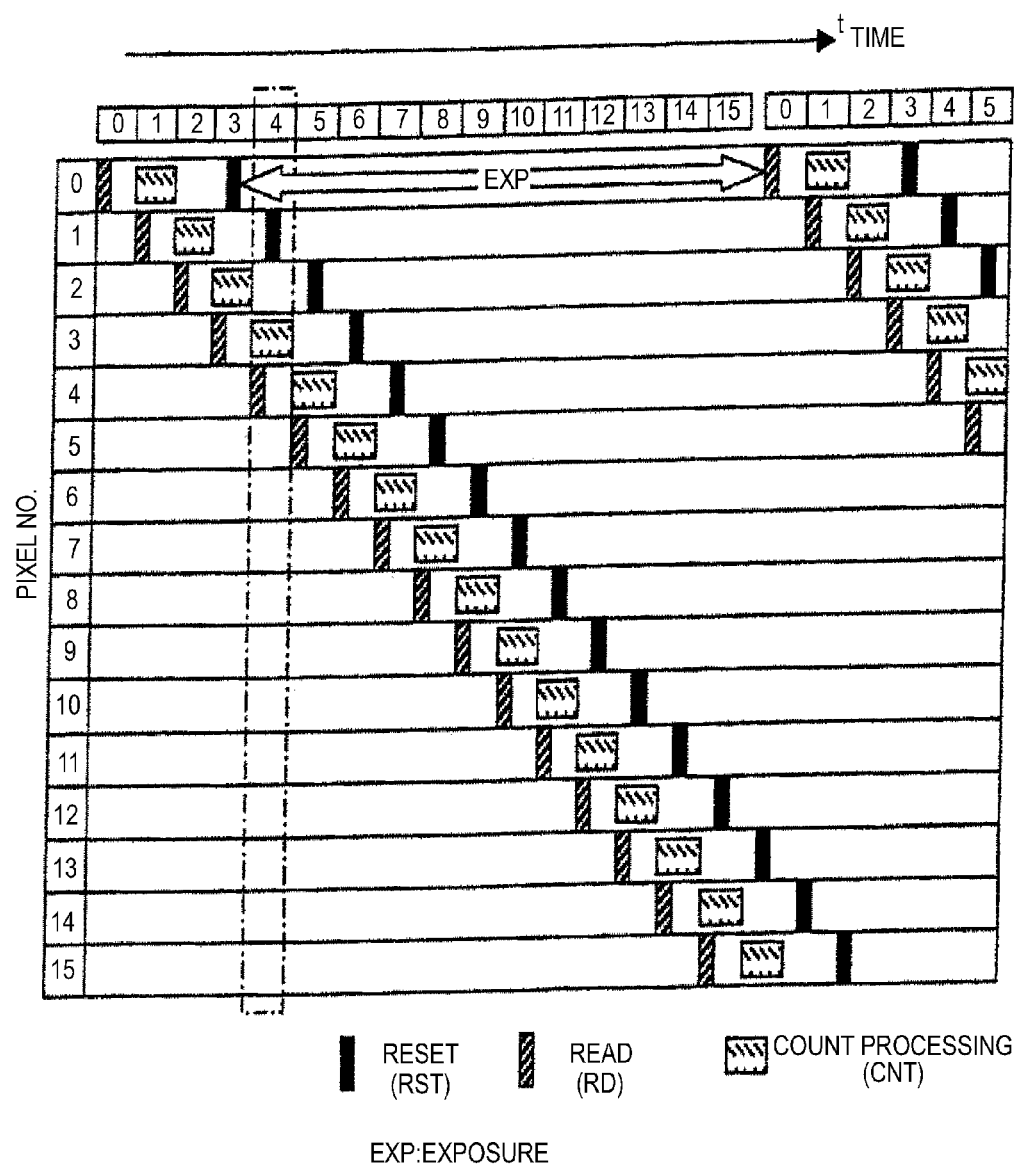
FIG. 5 is a view for explaining the cyclic access of pixel blocks in the first embodiment.

FIG. 5 is a view for explaining the cyclic access of pixel blocks in the first embodiment.

Here, an example where a pixel block is formed by 16 pixels and one sensing circuit is shared is shown for the sake of simplicity.

16 pixels included in each pixel block 160 (160-0 to 160-3, . . . ) are sequentially accessed in a cyclic manner.

Assuming that the frame rate is 1/30 second and reading of each pixel is executed 1023 times during this time, 1 cycle of block processing is about 32 microseconds. It is necessary to complete reading of 16 pixels during this time.

Time division on the vertical axis in FIG. 5 is a time t assigned to access to each pixel in a block, and the maximum width is 2 microseconds.

In addition, when the pixel block 160 (160-0 to 160-3, . . . ) includes 128 pixels as in the example shown in FIG. 1, access time of each pixel is 250 nanoseconds.

Since data reading from each pixel and data determination are a simple operation similar to reading of a semiconductor memory, there are sufficient allowances in this time width.

In the cyclic access described above, resetting RST and reading RD of each pixel DPX are cyclically executed.

In this case, access timing differs according to each pixel, but a time for substantial exposure EXP from the resetting RST to the reading RD is equal for all pixels.

Since the exposure time can be changed by changing the timing of the resetting RST within a range of a cycle, it is possible to adjust the sensitivity without having an effect on other circuit operations.

For example, if the resetting RST is set immediately after the last reading RD (the same time division as for reading) in each pixel DPX, the exposure time becomes a maximum and this corresponds to low-illuminance subject imaging.

On the contrary, if the resetting RST is set immediately before the reading RD (time division before one-time reading), the exposure time becomes shortest and this corresponds to high-illuminance subject imaging. In addition, if the reset timing is changed through several steps in the same time division, the exposure time can be selected more freely.

Although count processing CNT is executed successively after the reading RD, but reading of the next pixel is started in parallel.

Here, for example, pixel No. 4 is read at time t4, and pixel No. 1 is reset. Moreover, in parallel with this, count processing of pixel No. 3 is executed.

In this example, the reading of the pixel No. 4 and the resetting of the pixel No. 1 are executed in series in a time-division manner. In the case of a pixel shown in FIG. 4 which has a separate reset mechanism in each pixel, however, the reading of the pixel No. 4 and the resetting of the pixel No. 1 maybe executed simultaneously and in parallel by driving two row control lines.

As described above, the CMOS image sensor 100 according to the first embodiment has a hierarchical structure in which the plurality of pixels DPX share the sensing circuit 121 (121-0 to 121-3) and the register 151 (151-0 to 151-3) and the plurality of sensing circuits 121 (121-0 to 121-3) share the counting circuit 153.

Each sharing rate can be optimized on the basis of the relationship between the access time and the occupying area of each circuit.

In addition, the circuit block 200 shown in FIG. 1 which has four pixel blocks may be arrayed in a plural number in the horizontal direction (column arrangement direction).

For example, a light receiving device including "128×128" pixels can be formed by arraying 32 circuit blocks 200 in parallel and making them operate in parallel. The performance of such a light receiving device is estimated below.

It is assumed that imaging of 10 bits of each pixel is executed with 30 frames per second.

When the numbers of counts of all pixels are added and the result is used in a single photon counter, the maximum value of the total number of counts of photons per second is calculated as "128×128×1023×30", reaching 500 million.

Even if only a linear region of the Poisson distribution is used, the maximum value is 200 million. If correction is made, counting beyond the above is also possible.

Moreover, as described above, such a light receiving device may be used for two-dimensional imaging according to its application, and may also be used as a single light receiving device for photon counting.

They can change the operation mode easily by rewriting the internal register value from the outside. Changing the exposure time by changing the reset timing is also programmable in the same method.

Moreover, as described above, a digital pixel used in the present embodiment has a photoelectric conversion device and has a function of outputting an electric signal according to the incidence of a photon. For example, the digital pixel used in the present embodiment is configured as shown in FIG. 4.

Moreover, in order to offset the output variations in pixels when reading the data read from digital pixels, it is desirable to introduce the following self-reference function at the time of sensing.

That is, an output in a reset state and a signal output after exposure are read from a pixel, and a sensing circuit adds an offset value to either one of them and compares a signal, which is obtained by addition of the offset value, with the other signal to execute binary determination.

FIG. 6 is a circuit diagram showing an example of a sensing circuit having a self-reference function.

A sensing circuit 121A shown in FIG. 6 includes switches SW121, SW122, and SW123, capacitors C121 and C122, inverters IV121 and IV122, and a supply line L121 of an offset signal OFFSET.

A terminal a of the switch SW121 is connected to a first terminal of the capacitor C121 and a first terminal of the capacitor C122, and a terminal b of the switch SW121 is connected to a terminal SIG connected to an output signal line.

A second terminal of the capacitor C121 is connected to an input terminal of the inverter IV121, a terminal a of the switch SW122, and a terminal a of the switch SW123.

A second terminal of the capacitor C122 is connected to the supply line L121 of the offset signal OFFSET.

An output terminal of the inverter IV121 is connected to an input terminal of the inverter IV122 and a terminal b of the switch SW122.

An output terminal of the inverter IV122 is connected to a terminal b of the switch SW123 and an output terminal SAOUT.

Here, an example of a read operation using the sensing circuit having a self-reference function, which is shown in FIG. 6, in the example of the pixel in FIG. 4 will be described.

FIGS. 7A to 7F are timing charts for explaining an example of the read operation using the sensing circuit having a self-reference function, which is shown in FIG. 6, in the example of the pixel in FIG. 4.

FIG. 7A shows a reset pulse RESET applied to the reset line 182 in FIG. 4, and FIG. 7B shows a read pulse READ applied to the transfer line 181 in FIG. 4.

FIG. 7C shows an ON/OFF state of the switch SW121, FIG. 7D shows an ON/OFF state of the switch SW122, FIG. 7E shows an ON/OFF state of the switch SW123, and FIG. 7F shows the offset signal OFFSET.

First, the switches SW121 and SW122 are turned ON to apply the reset pulse RESET to the reset line 182 of the pixel DPX, so that a pixel output in the reset state is read to the input terminal SIG.

Then, the switch SW122 is turned OFF to hold the reset output.

Then, the pulse READ is applied to the transfer line 181 of the pixel DPX and the signal output, which is an exposure result, is input to the terminal SIG to turn OFF the switch SW121.

During this period, the offset signal OFFSET input is kept at 0 V.

Then, the level of the offset signal OFFSET is slightly increased to add an offset electric potential to the read signal through the capacitor C122.

Then, the output in the reset state is compared with the output obtained by adding a small offset value to the read signal.

When a photon is incident on the pixel shown in FIG. 4, the latter signal has a lower electric potential than the former signal. Accordingly, "0" is output to the output terminal SAOUT.

When a photon is not incident on the pixel, "1" is output to the output terminal SAOUT in the opposite manner as when a photon is incident on the pixel.

Finally, the switch SW123 is turned ON to latch the determination result.

Such a self-reference function offsets fixed noise in each pixel, which occurs due to a variation in the threshold value of the amplifier transistor 114, so that it also becomes possible to perform accurate binary determination for a small signal. In addition, in the above-described sequence, kTC noise occurring at the time of resetting is also offset.

In addition, a similar effect can also be expected in correlated double sampling (CDS) at the time of AD conversion of an analog signal.

In this case, time taken for double reading and determination is fixed all the time in sensing for binary determination. Accordingly, the influence of thermal noise or flicker noise from an amplifier transistor of a pixel or the sensing circuit itself can also be reduced as follows.

That is, since noise in a low frequency band is often superimposed similarly in both reading, the influence can be offset. In addition, noise in a high frequency band may limit the sensitivity of a capacitive load of a sensing circuit.

Accordingly, by setting the capacitive load as large as possible within the range in which sensing can be correctly performed, it is possible to narrow the bandwidth of influential noise to the minimum.

In the correlated double sampling at the time of AD conversion, time taken for conversion changes in many cases according to the signal intensity or the number of bits. For this reason, the circuit is necessarily influenced by the noise in a wide band.

Without being limited to the example described above, the circuit may execute determination by comparing a signal, which is obtained by adding an offset value to a reset signal, with a read signal.

Alternatively, it is also possible to acquire a read signal first and then to reset a pixel to acquire a reset signal and to add an offset value to either one of the signals for comparison determination. In this case, it is difficult to offset the kTC noise, but the fixed noise caused by variations in pixels can be offset. Accordingly, there is an advantage in that this can be generally applied to all pixel configurations.

Even if such a self-reference function is applied, the number of sensing circuits is much smaller than that in a normal AD converter. Accordingly, a large occupying area is not necessary.

Moreover, in order to realize a digital pixel, it is also a good choice to use an internal amplification type photodiode.

As the internal amplification type photodiode, an avalanche photodiode (APD) is known which generates avalanche amplification by accelerating photoelectrically converted electron-hole pairs by an electric field.

A photon counter in the related art which uses the APD performs only analog amplification of a pixel signal, performs the pulse output, and detects it by an external circuit. In this case, amplification near 1 million times is executed to detect a single photon using the Geiger mode. Accordingly, a high voltage of 40 V is necessary, and a detection circuit is not provided either. For this reason, miniaturization of a pixel or a high-speed parallel operation is difficult.

On the other hand, the Geiger mode operation is not necessary for the digital pixel applied to the present embodiment. Since time-division binary detection in a chip using a simple circuit configuration can significantly reduce the detection circuit noise and the signal load, it is possible to detect a single photon with a small gain in a linear mode.

Also in this case, the pixel circuit shown in FIG. 4 can be used, but an amplifier transistor of a pixel is not necessary if amplification of 1000 times is obtained, for example.

3. Second Embodiment

Next, an example of the configuration in which an internal amplification type diode is applied to a light receiving device will be described as a second embodiment.

Figure 8:
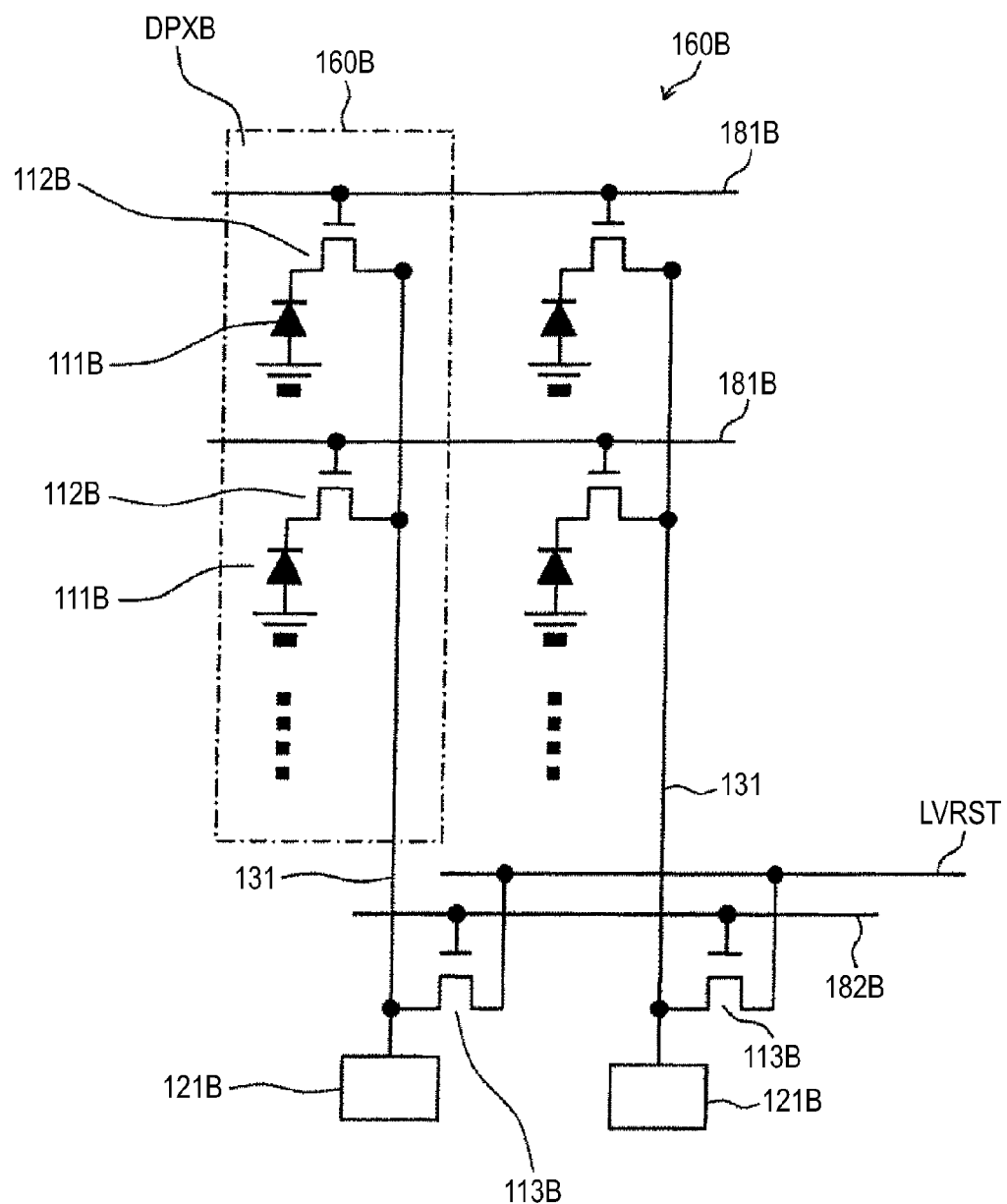
FIG. 8 is a view for explaining a second embodiment of the present disclosure and is also a view showing an example of the configuration of a pixel block corresponding to the first embodiment using an internal amplification type photodiode.

FIG. 8 is a view for explaining the second embodiment of the present disclosure and is also a view showing an example of the configuration of a pixel block corresponding to the first embodiment using an internal amplification type photodiode.

In the second embodiment, a pixel block 160B includes only a group of internal amplification type photodiodes 111B and transfer (selection) transistors 112B corresponding to the internal amplification type photodiodes 111B.

That is, the pixel DPXB in this example is formed only by the internal amplification type photodiodes 111B and the transfer (selection) transistors 112B corresponding to the internal amplification type photodiodes 111B. A gate electrode of the transfer transistor 112B of each pixel DPXB on the same row is connected to a common transfer line 181B. In addition, sources or drains of the transfer transistors 112B of a plurality of pixels of each pixel block 160B are connected to the common output signal line 131.

In addition, a reset transistor 113B is connected between each output signal line 131 and a reset potential line LVRST. A gate electrode of each reset transistor 113B is connected to the common reset line 182B.

In this example, each pixel DPXC is reset through the reset transistor 113B, the output signal line 131, and the transfer transistor 112B.

4. Third Embodiment

Next, an example of the configuration of an imaging apparatus using a plurality of light receiving devices (light receiving units and circuit blocks) of the imaging device according to the first or second embodiment will be described as a third embodiment.

In a semiconductor imaging apparatus represented by a general CCD type or CMOS sensor type imaging device, there are characteristic variations in amplifier circuits of a CCD output unit or in source-follower circuits connected to respective pixels of a CMOS sensor.

Moreover, in a general semiconductor imaging apparatus, this characteristic variation is reflected as it is on a variation in the efficiency of conversion from the number of accumulated electrons into an analog electric signal.

In addition, since conversion variations in AD converters are also directly reflected on signal variations, variations in the effective sensitivity of respective chips are very large.

Therefore, when performing large-area imaging by arraying the plurality of imaging devices in a common semiconductor imaging apparatus, it is necessary to make the sensitivity uniform by adjusting the gain of each chip.

On the other hand, since the imaging device (light receiving device) according to the embodiment of the present disclosure to which time-division photon counting is applied does not treat an analog signal basically, sensitivity variations in respective chips are very small.

Accordingly, it is possible to form a large imaging surface by arraying these imaging devices in a one-dimensional linear shape or in a two-dimensional array.

For example, such an imaging apparatus can be used for radiation imaging for medical or security applications by disposing a scintillator in front of a light receiving device. In addition, since the sensitivity is high and amount of noise is small, the imaging apparatus can detect a very small amount of radiation correctly.

Accordingly, for example, in medical imaging, it is possible to significantly reduce the amount of exposure to an object to be imaged by limiting the amount of radiation.

Figure 9A:
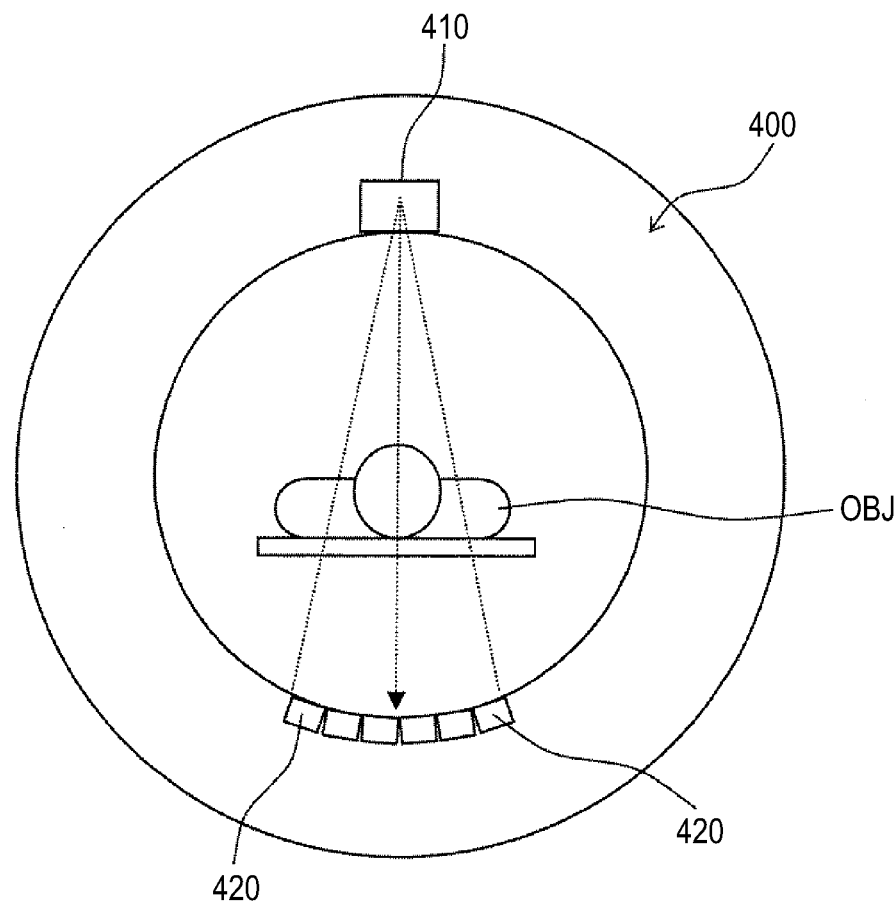
FIGS. 9A and 9B are conceptual views of an imaging apparatus when the imaging device according to the embodiment of the present disclosure is applied to CT (Computer Tomography) imaging.
Figure 9B:
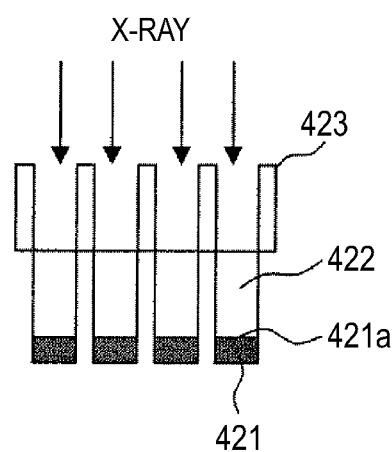

FIGS. 9A and 9B are conceptual views of an imaging apparatus when the imaging device according to the embodiment of the present disclosure is applied to CT (Computer Tomography) imaging.

An imaging apparatus 400 which surrounds a subject OBJ in a cylindrical shape includes an X-ray source 410 and thousands of imaging devices 420, which are disposed in an array so as to face the X-ray source 410 and which use photon counters according to the embodiment of the present disclosure.

The array surface is curved along the inner wall of the cylinder so that the imaging devices face the X-ray source 410 at equal distances therebetween.

In each imaging device 420, a scintillator 422 is attached to a light receiving surface 421a side of a photon counter 421 in the embodiment of the present disclosure, and a collimator 423 is disposed at the incidence side of X-rays.

X-rays which are transmitted through the subject OBJ from the X-ray source 410 and are then transmitted through the collimator 423 are converted into visible light by the scintillator 422 and are detected by the photon counter 421, and the amount of radiation is derived.

The imaging apparatus 400 rotates around the subject OBJ to image the subject OBJ at all angles, and arithmetic processing on the obtained data is executed to generate a cross-sectional transmission image of the subject OBJ.

The photon counter of the imaging device according to the embodiment of the present disclosure has a very high dynamic range as well as high-sensitivity reading and no noise.

In addition, since the imaging device includes a counting circuit inside, it is possible to perform high-speed imaging even at high-bit resolution. Accordingly, accurate imaging can be realized even if the quantity of X-rays is significantly reduced, and the system is not expensive.

As an example of a similar imaging system, there is a SPECT for medical applications.

This detects γ-rays using a scintillator, but a photomultiplier tube is used to detect a very small quantity of γ-rays.

If the photon counter in the embodiment of the present disclosure is used, the cost of a detector is significantly reduced, and an external detection circuit is not necessary either. As a result, since the number of detectors can be increased tens of times, it is possible to improve the sensitivity significantly.

FIG. 10 is a view showing an example of a linear imaging apparatus in which the imaging devices (light receiving devices) according to the embodiment of the present disclosure are arrayed in a one-dimensional linear shape.

Imaging devices (light receiving devices) 510 according to the embodiment of the present disclosure are arrayed linearly and alternately in a linear imaging device 500.

By moving the linear imaging device 500 in a direction of arrow A, a wide imaging surface can be uniformly scanned in an effective pixel region 520 of the imaging device (light receiving device) 510.

For the scanning, it is preferable to make stepwise movement at pitches in the longitudinal direction (row direction) of the effective pixel region 520, or it is possible to move a subject. A connection part between effective pixel regions maybe subjected to averaging processing by making some pixels overlap each other.

The effective pixel region 520 of each imaging device (light receiving device) 510 has a configuration in which 128 blocks of the pixel array section shown in FIG. 1 are arrayed in the horizontal direction (column direction), for example. That is, the effective pixel region 520 of each imaging device (light receiving device) 510 is formed by "512×128" physical pixels.

Here, assuming that an addition result of count values of "8×8" physical pixels is a pixel unit (logic pixel), the number of logic pixels is 64×16. When each physical pixel has a resolution of 10 bits, the resolution of each logic pixel is 16 bits.

If such 64 imaging devices (light receiving devices) 510 are linearly arrayed as shown in FIG. 10, total 4096 16-bit logic pixels are arrayed in the linear imaging device 500.

Such a linear imaging apparatus can realize miniature imaging easily. Accordingly, X-ray imaging for medical or security applications becomes possible with high precision and very high sensitivity (low noise) by combination with a scintillator.

Since the absolute quantity of X-rays can be reduced, it is possible to suppress the amount of exposure even in the case of line imaging. In addition, the system is not expensive. In addition, a plurality of such linear imaging apparatuses may be arrayed at equal distances in the scanning direction in order to shorten the scanning distance. In this case, the amount of exposure can be further reduced.

Figure 11:
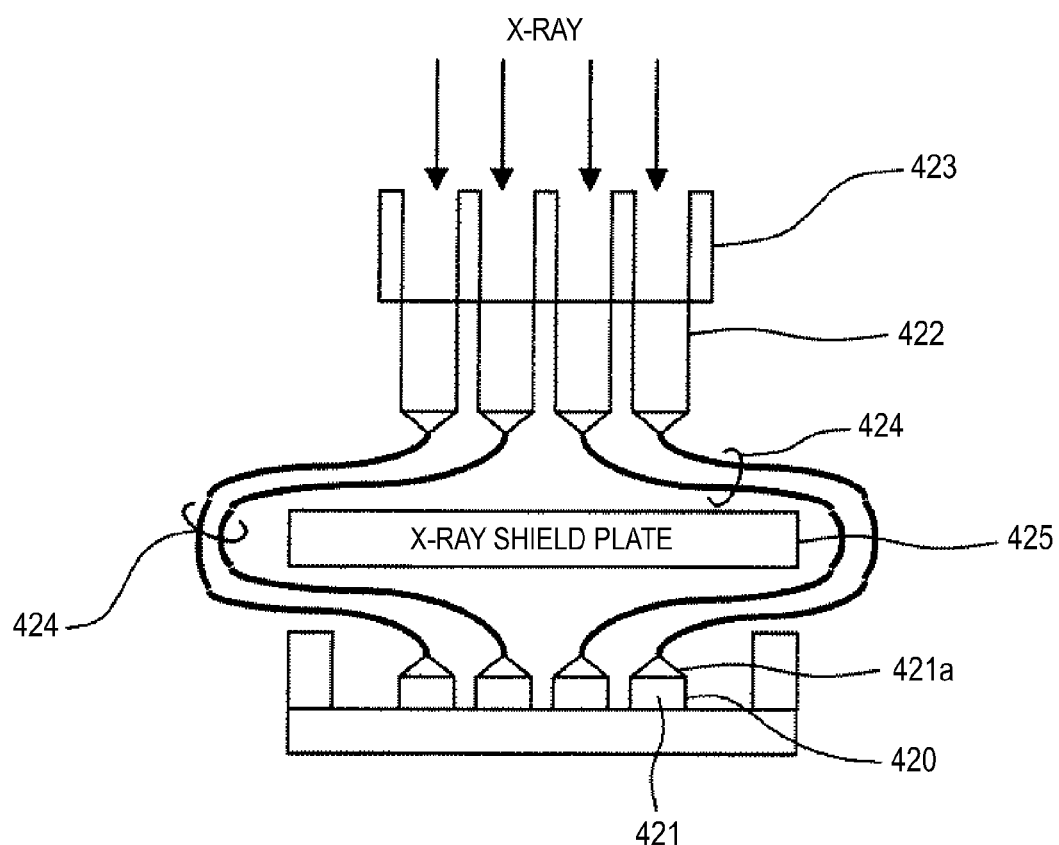
FIG. 11 is a view showing the example of radiation-proof protection of the imaging device (light receiving device) according to the embodiment of the present disclosure.

Moreover, in order to prevent an X-ray transmitted through the scintillator from damaging the imaging device, it is possible to place the imaging device 420 at a location distant from the scintillator 422 and transmit the emission of the scintillator to the imaging device 420 using an optical fiber 424 as shown in FIG. 11, for example.

In the example shown in FIG. 11, an X-ray shield plate 425 which blocks X-rays is disposed between the light receiving surface 421a of the photon counter 421 of the imaging device 420 and a light receiving unit of the scintillator 422, and the optical fiber 424 is disposed so as to bypass the X-ray shield plate 425.

On the other hand, for radiation detection in measurements in the medical or scientific fields, the irradiation angle of radiation may be necessary as information. For a photon counter used in such a case, high time resolution for specifying the detection time is necessary.

For example, in a PET used for medical applications, a positron is generated by a radioactive material administered to a patient, and the positron is combined with an electron immediately to excite a pair of γ-rays. The pair of γ-rays are emitted in opposite directions and are detected simultaneously and in parallel by two detectors (scintillators). Thus, the existence of a radioactive material is estimated on the straight line connecting two detectors.

Generally, in the PET, it is necessary to reduce noise at the time of detection by executing the determination of simultaneous detection with high time resolution.

Figure 12:
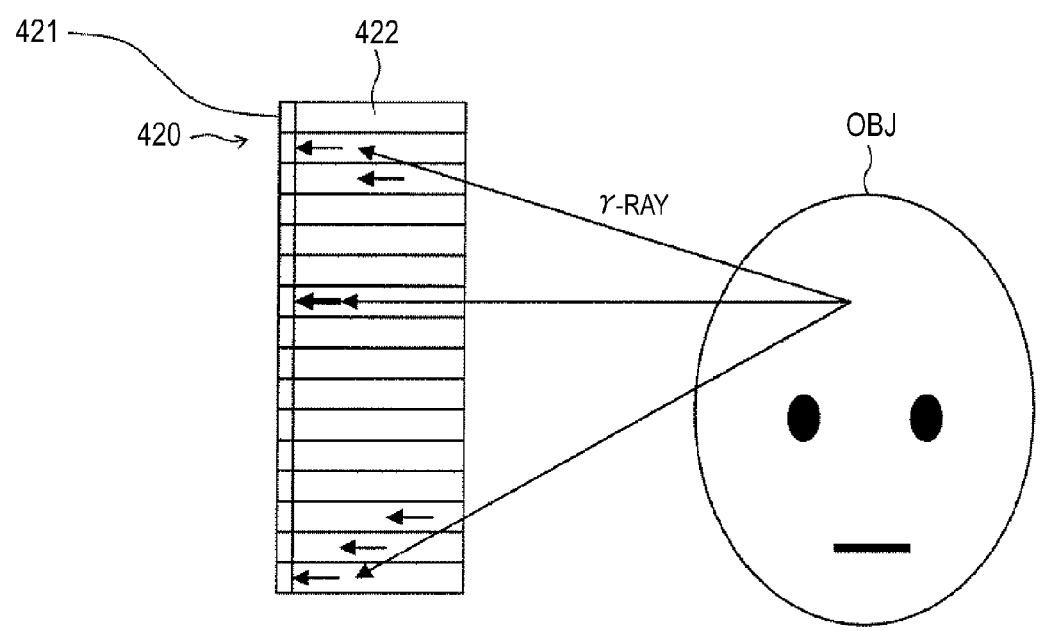
FIG. 12 is a schematic view showing an example of estimation of the direction of radiation incidence by simultaneous detection of photons.

FIG. 12 is a schematic view showing an example of estimation of the direction of radiation incidence by simultaneous detection of photons.

FIG. 12 shows a simple application in the SPECT.

By γ-rays incident perpendicular to the scintillator (detector) 422 among γ-rays emitted from the subject OBJ, many photon groups are incident simultaneously on the photon counter 421 of one imaging device 420.

On the other hand, by γ-rays which are obliquely incident on the scintillator (detector) 422, photon groups distributed in the plurality of imaging devices 420 are incident simultaneously.

Thus, it is possible to estimate the incidence direction of γ-rays using the information regarding the distribution of photons simultaneously detected.

Usually, a collimator is used in the SPECT to use the information regarding only a photon which is vertically incident. However, if the time resolution of detectors is high and they can be easily used, it is possible to expand the amount of information more significantly.

That is, in order to improve the detection accuracy by reducing a detection error in such a detector, high time resolution for determining simultaneous detection of the photon incidence is important.

Hereinafter, a new technique for improving the time resolution of optical detection in the photon counter related to the embodiment of the present disclosure and the chip architecture will be described as third and fourth embodiments.

5. Fourth Embodiment

Figure 13:
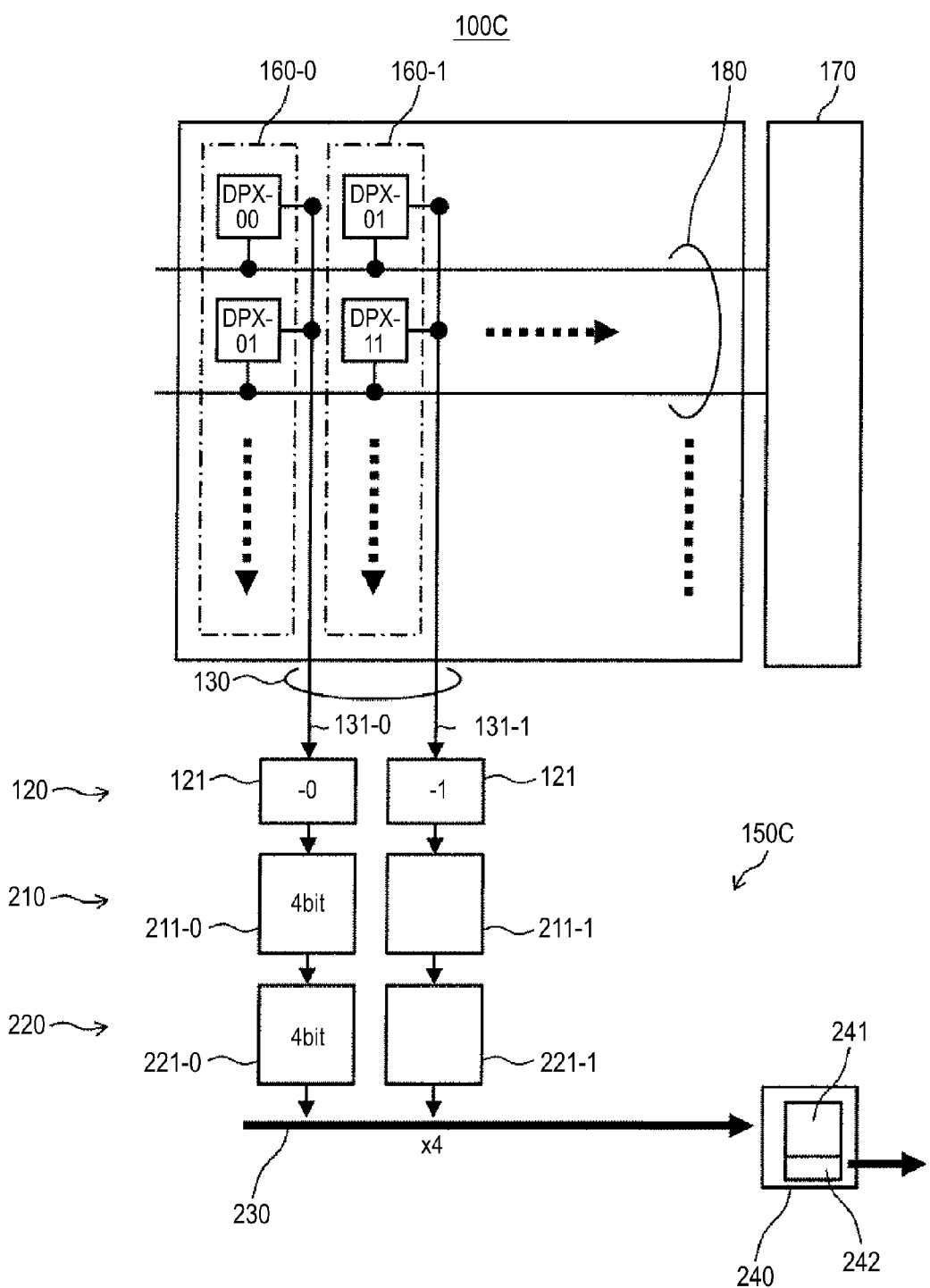
FIG. 13 is a view showing an example of the configuration of a CMOS image sensor (imaging device) according to a fourth embodiment of the present disclosure.

FIG. 13 is a view showing an example of the configuration of a CMOS image sensor (imaging device) according to a fourth embodiment of the present disclosure.

A CMOS image sensor (imaging device) 100C related to the fourth embodiment is different from the CMOS image sensor 100 according to the first embodiment shown in FIG. 1 in that it has a function of improving the time resolution of optical detection.

Basically, the CMOS image sensor 100C is configured such that a determination result integration circuit section 150C has a function of improving the time resolution of optical detection.

The determination result integration circuit section 150C includes a sensing circuit section 120, first and second register sections 210 and 220, a 4-bit bus 230, and an output circuit 240.

The first register section 210 has 4-bit registers 211-0, 211-1, . . . which transfer outputs of sensing circuits 121-0, 120-1, . . . sequentially corresponding to the column arrangement of pixels of the pixel array section 110.

The first register section 210 has a configuration equivalent to the configuration in which line buffers, which hold and output the read data of one row, are arrayed in four rows.

The second register section 220 has 4-bit registers 221-0, 221-1, . . . which transfer outputs of the 4-bit registers 211-0, 211-1, . . . of the first register section 210 sequentially.

The second register section 220 has a configuration equivalent to the configuration in which line buffers, which hold and output the read data of one row, are arrayed in four rows.

The bus 230 transmits the output data of the second register section 220 to the output circuit 240.

The output circuit 240 has a counting circuit 241 and an output latch 242. The counting circuit 241 counts or adds the data of "1" of each row transmitted through the bus 230.

Also in the fourth embodiment, the pixel block 160 (160-0, 160-1, . . . ) is configured to include 128 digital pixels DPX and a selection circuit as in the first embodiment. The selection circuit selects one of the pixels to execute resetting or reading.

Also in the fourth embodiment, one pixel in the pixel block is selected according to a row control line 180 driven by the row driving circuit 170.

At the time of reading, whether or not there is an incidence of a photon on the selected pixel is output as an electric signal to the output signal line 131 and the binary value is determined by the sensing circuit 121 (121-0, 121-1, . . . ).

For example, the sensing circuit 121 (121-0, 121-1, . . . ) determines "1" as a determination value if light is incident on the selected pixel and determines "0" as a determination value if light is not incident on the selected pixel and latches the determination value.

Then, the determination value of the sensing circuit 121 (121-0, 121-1, . . . ) is transmitted to the first bit of the 4-bit register 211 (211-0, 211-1, . . . ) of the first 4-bit register section. Accordingly, signal reading and determination of the next row become possible.

Such an operation is continuously performed for four rows. When the determination values of the respective rows are stored in different bits of the 4-bit registers 211 (211-0, 211-1, . . . ), they are simultaneously transferred to the 4-bit registers 221 (221-0, 221-1, . . . ) of the second register section 220 at the next stage.

Then, the data held in the 4-bit registers 220 (220-0, 220-1, . . . ) of the second register section 220 in each column is sequentially output to the 4-bit bus 230 and is then transmitted to the output circuit 240.

The counting circuit 241 is disposed in the output circuit 240 in order to count or add the data of "1" of each row. After all column data items of four rows are transferred, the addition value of each row is stored in the output latch 242.

On the other hand, reading of the pixel array section 110 is continuously executed in parallel with the transfer operation described above, and determination values of the next four rows are stored in the 4-bit registers 211 (211-0, 211-1, . . . ) of the first register section 210. That is, reading and transfer of data to the output circuit 240 are pipelined.

In such a chip, assuming that it takes 250 nanoseconds to perform reading of one row, data transfer of 128 columns is performed for 1 microsecond.

Since 4-bit transfer of one column is 7.8 nanoseconds, time for data transfer in a normal semiconductor circuit is sufficient. The peripheral circuit configuration is very simple.

In addition, for data reading from the outside, it is preferable to acquire the count values of four rows stored in the output latch 242 of the output circuit 240 for 1 microsecond.

Since this is a very sufficient time for the reading, an external system can read the data in parallel from many imaging devices.

The external system can derive the total number of photons, which are incident on imaging devices within the unit exposure time of maximum 32 microseconds, by adding the read data of all rows.

By repeating this 1025 cycles and adding the count values continuously, it is possible to obtain 24-bit gray-scale data for 1/30 second.

Here, time resolution of photon detection using the imaging device according to the fourth embodiment will be described with reference to FIG. 14.

Figure 14:
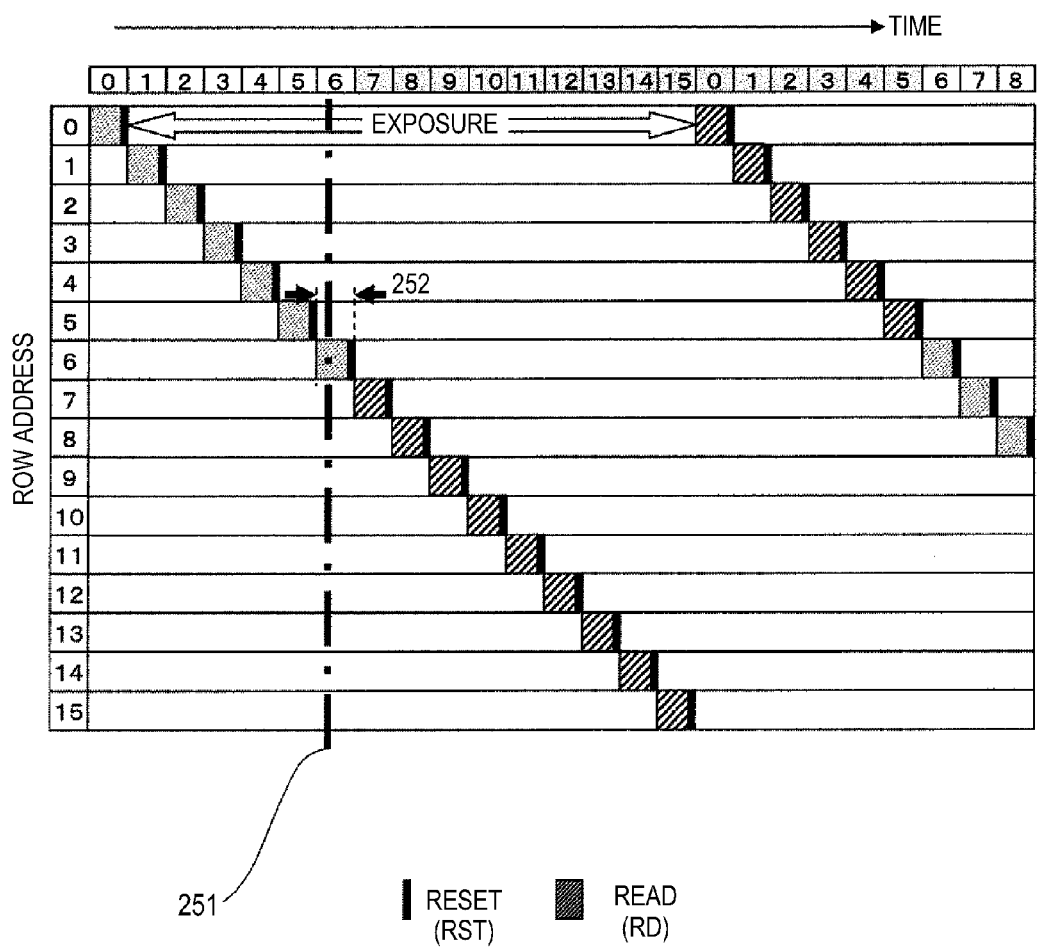
FIG. 14 is a view for explaining the time resolution of photon detection using the imaging device according to the fourth embodiment.

FIG. 14 is a view for explaining the time resolution of photon detection using the imaging device according to the fourth embodiment. FIG. 14 shows a state in which reading and resetting are sequentially executed for each row according to the elapse of time.

In a PET or the like, when γ-rays are incident on a scintillator, many photons are generated to be incident on corresponding imaging devices.

Assuming that this timing is a dotted line 251, a photon is selectively detected only in row reading (expressed with thick oblique lines: RD) in which exposure time includes this time.

In this example, detection is performed until the row address takes nearly one round from reading immediately after the generation of a photon (row address: 7), and then the data becomes zero. That is, if an output of row data of 1 or more occurs continuously or intermittently during a period for which the row address takes a round, this is photon generation.

Here, the total number of photons which are incident simultaneously on imaging devices is the total addition value of row data outputs for one round. In addition, it can be estimated that the generation time is at 252 between the read time of a row, in which an output of 1 or more appears first, and the read time of a row before the row in which an output of 1 or more appears first. The time resolution is a read time for one row, that is, 250 nanoseconds.

That is, using this method, the incidence time when a plurality of photons are incident simultaneously on imaging devices is specified from the distribution of the number of incidences for each row by performing photon detection cyclically while shifting the read timing of each row. In this case, the amount of read timing shift of each row corresponds to time resolution. Accordingly, if the amount of shift is made small, the time resolution of detection is improved in proportion to it.

6. Fifth Embodiment

Figure 15:
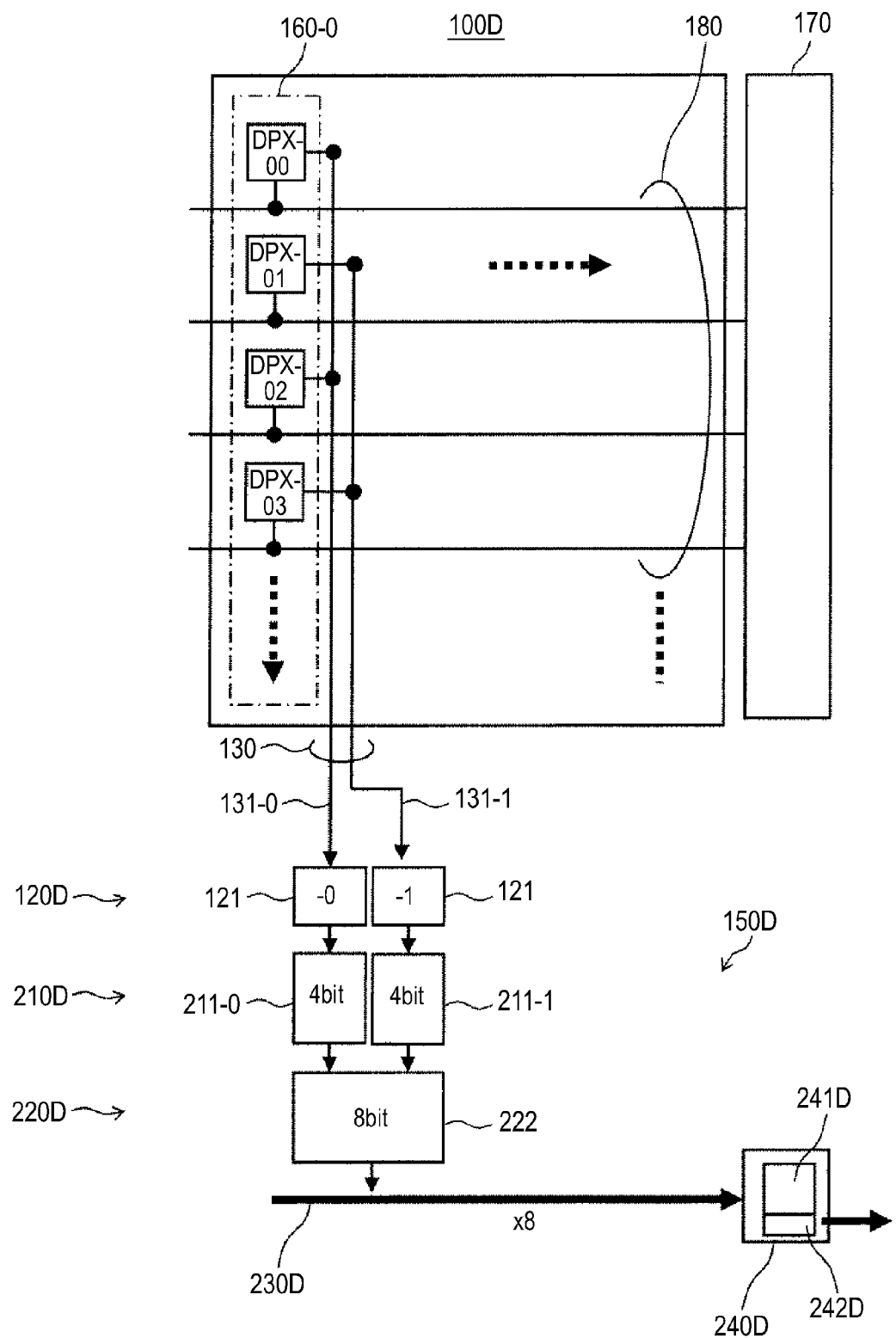
FIG. 15 is a view showing an example of the configuration of a CMOS image sensor (imaging device) according to a fifth embodiment of the present disclosure.

FIG. 15 is a view showing an example of the configuration of a CMOS image sensor (imaging device) according to a fifth embodiment of the present disclosure.

A CMOS image sensor (imaging device) 100D according to the fifth embodiment is different from the CMOS image sensor 100C according to the fourth embodiment shown in FIG. 13 in the following point.

In the fourth embodiment, the amount of shift is almost equal to the read time of one row. Also in the fifth embodiment, the time resolution can be improved even if the amount of shift is reduced without changing the read time.

In the determination result integration circuit section 150D, two adjacent sensing circuits 121-0 and 121-1 correspond to one row in the sensing circuit section 120D.

Corresponding to this, two adjacent 4-bit registers 211-0 and 211-1 of the first register section 210D correspond to one row.

In addition, in the second register section 220D, bit registers 222-0, . . . are arrayed corresponding to 4-bit registers.

Also in the fifth embodiment, the pixel block 160 (160-0, 160-1, . . . ) is configured to include 128 digital pixels DPX and a selection circuit as in the fourth embodiment. The selection circuit selects one of the pixels to execute resetting or reading.

Also in the fifth embodiment, one pixel in the pixel block is selected according to the row control line 180 driven by the row driving circuit 170.

In addition, in the fifth embodiment, two circuits are prepared for each column for reading so that connections to different circuits are alternately made in odd and even rows.

For example, at the time of reading of a pixel DPX00, whether or not there is an incidence of a photon on the selected pixel is output as an electric signal to the output signal line 131-1 and the binary value is determined by the sensing circuit 121-0. For example, the sensing circuit 121-0 determines "1" as a determination value if light is incident on the selected pixel and determines "0" as a determination value if light is not incident on the selected pixel and latches the determination value. Then, the determination value of the sensing circuit 121-0 is transmitted to the first bit of the 4-bit register 211-0 of the first 4-bit register section 210D. Such reading is executed for four rows.

On the other hand, at the time of reading of a pixel DPX01, whether or not there is an incidence of a photon on the selected pixel is output as an electric signal to the output signal line 123-1 and the binary value is determined by the sensing circuit 121-1. The determination value is latched by the sensing circuit 121-1 and is then transmitted to the 4-bit register 211-1 at the next stage. Such reading is executed for four rows.

After performing the above reading for four rows, the determination values are simultaneously transferred to an eight-bit register 222 of the second register section 220D at the next stage. Then, the data held in the 8-bit register 222 of each row is sequentially output to an 8-bit bus 230D and is then transmitted to the output circuit 240D. A counting circuit 241D is disposed in the output circuit 240D in order to count or add the data of "1" of each row. After all column data items of eight rows are transferred, the addition value of each row is stored in the output latch 242D.

Thus, the procedure of reading, transfer, and output is basically the same as that in FIG. 14, but the read operation is divided according to two lines of odd and even rows in this example.

These operations are executed in parallel while shifting the timing by a half period.

Here, time resolution of photon detection using the imaging device according to the fifth embodiment will be described with reference to FIG. 16.

Figure 16:
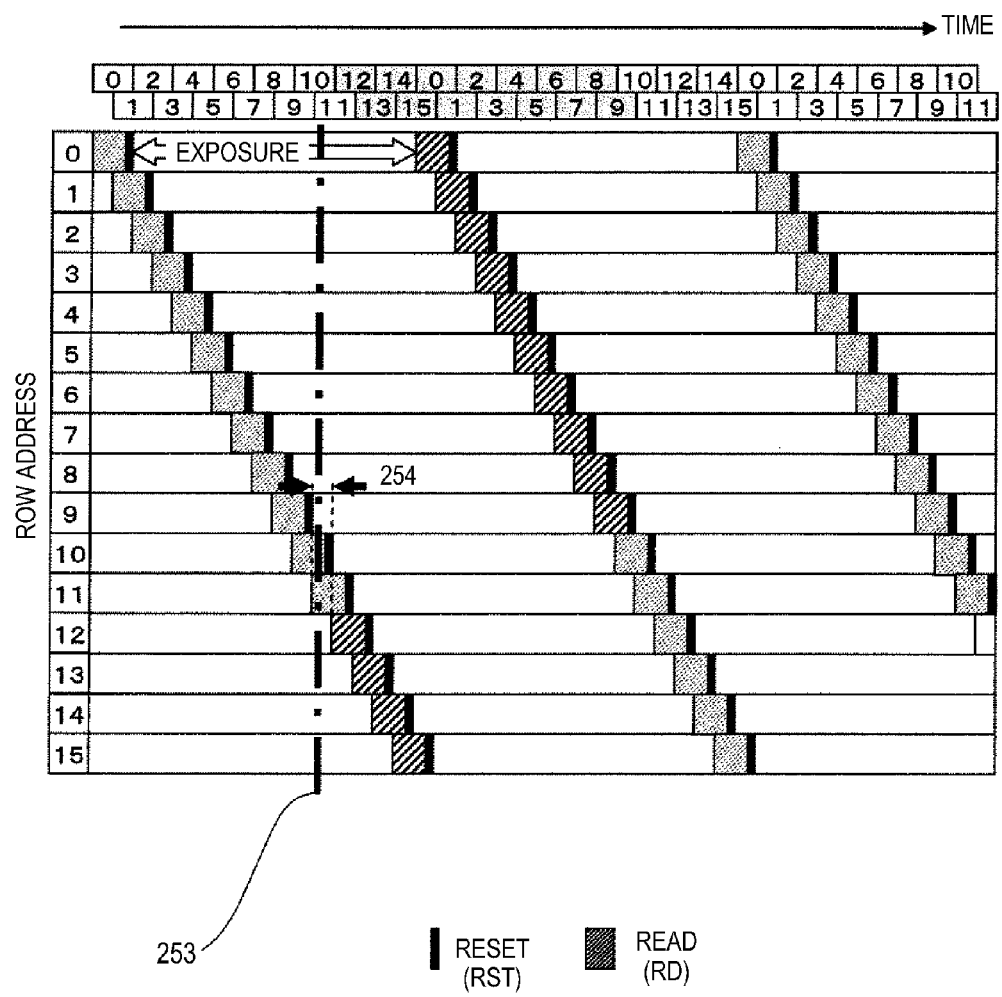
FIG. 16 is a view for explaining the time resolution of photon detection using the imaging device according to the fifth embodiment.

FIG. 16 is a view for explaining the time resolution of photon detection using the imaging device according to the fifth embodiment. FIG. 16 shows a state in which reading and resetting are sequentially executed for each row according to the elapse of time.

By providing two read circuits in parallel, reading of the next row is started without waiting for the completion of reading of the previous row. In addition, the shift of read time is a half period of the read period.

In a PET or the like, when γ-rays are incident on a scintillator, many photons are generated to be incident on corresponding imaging devices. Assuming that this timing is a dotted line 253, a photon is selectively detected only in row reading (expressed with thick oblique lines: RD) in which exposure time includes this time.

In this example, detection is performed until the row address takes nearly one round from reading immediately after the generation of a photon (row address: 12), and then the data becomes zero. That is, if an output of row data of 1 or more occurs continuously or intermittently during a period for which the row address takes a round, this is photon generation.

Here, the total number of photons which are incident simultaneously on imaging devices is the total addition value of row data outputs for one round. In addition, it can be estimated that the generation time is at 254 between the read time of a row, in which an output of 1 or more appears first, and the read time of a row before the row in which an output of 1 or more appears first.

The time resolution is a half period of a read period of one row, that is, 125 nanoseconds.

Thus, it is possible to reduce the shift of the read period without shortening the read period itself. For example, it is also possible to reach the time resolution comparable to a photomultiplier tube by increasing the number of reading systems further.

For example, in the case of an application to the PET, many imaging devices according to the embodiment of the present disclosure are arrayed in a ring shape, and the system reads the number of photons of each row sequentially for every unit exposure for each imaging device. Then, when the generation of a photon is detected, the total number of photons incident simultaneously on the imaging devices and the time stamp of the generation are recorded on a memory. These are necessary and sufficient data collected most efficiently.

By combining the data after finishing the imaging in order to identify a pair of imaging devices, on which photons are incident simultaneously, the existence of an irradiated material can be assumed on the line connecting the pair.

Using this technique, it is possible to significantly increase the number of imaging devices itself compared with that in the related art. In addition, it is also possible to significantly extend the degree of freedom in combination of imaging devices on which simultaneous incidence of photons is to be determined. Accordingly, since the sensitivity can be greatly improved, the amount of medicine administered can be reduced significantly. As a result, it is possible to reduce the radiation exposure of a subject and also to improve the measurement accuracy by suppressing accidental simultaneous generation of photons.

In addition, the solid state imaging devices according to the first and second embodiments described above may also be applied as imaging devices of a digital camera or a video camera.

7. Sixth Embodiment

Figure 17:
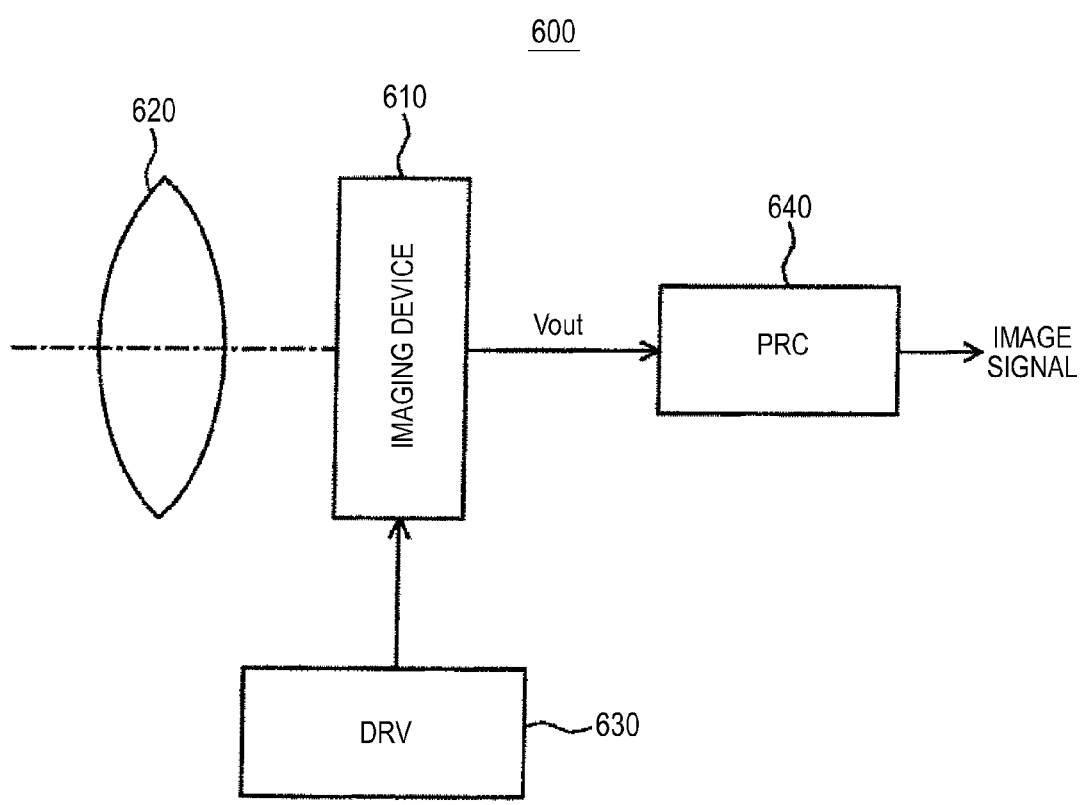
FIG. 17 is a view showing an example of the configuration of a camera system to which the solid state imaging device according to the embodiment of the present disclosure is applied.

FIG. 17 is a view showing an example of the configuration of a camera system to which the imaging device according to the embodiment of the present disclosure is applied.

As shown in FIG. 17, a camera system 600 includes an imaging device 610 to which a CMOS image sensor (imaging device) 100 according to the present embodiment can be applied.

The camera system 600 includes an optical system which guides light incident on a pixel region of the imaging device 610 (forms a subject image), for example, a lens 620 which forms incident light (image light) on the imaging surface.

In addition, the camera system 600 includes a driving circuit (DRV) 630 for driving the imaging device 610 and a signal processing circuit (PRC) 640 for processing an output signal of the imaging device 610.

The driving circuit 630 includes a timing generator (not shown) which generates various kinds of timing signals involving a start pulse or a clock pulse for driving circuits in the imaging device 610, and drives the imaging device 610 with a predetermined timing signal.

In addition, the signal processing circuit 640 performs predetermined signal processing on the output signal of the imaging device 610.

The image signal processed by the signal processing circuit 640 is recorded on a recording medium, such as a memory.

Hard copy of the image information recorded on the recording medium is executed by a printer or the like. In addition, the image signal processed by the signal processing circuit 640 is projected as a moving image on a monitor formed by a liquid crystal display or the like.

As described above, a high-precision camera which consumes low electric power can be realized by providing the above-described solid state imaging device 100 as the imaging device 610 in an imaging apparatus, such as a digital still camera.

In addition, although the configuration in FIG. 1 in which a plurality of pixels share a sensing circuit is necessary when providing the pixels and the sensing circuit on the same semiconductor substrate, a technique of forming a semiconductor layer with multiple layers using wafer bonding technology has also appeared in recent years. In such a case, for example, a sensing circuit of each pixel may be provided in the lower layer of each pixel.

Also in this case, addition between pixels can be easily executed by making a plurality of sensing circuits share an integrated circuit including a counter. As a result, it is possible to improve the dynamic range at the time of imaging.

The present disclosure contains subject matter related to that disclosed in Japanese Priority Patent Application JP 2010-224235 filed in the Japan Patent Office on Oct. 1, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:
a pixel array section having a plurality of pixels, each pixel being configured to generate a charge in response to photons and to convert the charge to an electric signal;
a sensing circuit section having a plurality of sensing circuits each configured to (i) receive electric signals from respective pixels, and (ii) perform binary determination regarding whether or not there is an incidence of photons on each of the respective pixels in a predetermined period; and
a determination result integration circuit section coupled to the sensing circuit section and configured to (i) integrate a plurality of determination results generated by the plurality of sensing circuits, and (ii) perform photon counting for integrating the plurality of determination results in the plurality of pixels to derive an amount of photon incidence on the light receiving section,
wherein
the determination result integration circuit section includes one counter circuit, the one counter circuit being shared by all of the plurality of sensing circuits, and
the one counter circuit is configured to perform count processing for integrating the plurality of determination results.

2. The imaging device according to claim 1,
wherein the photon counting is executed by forming a plurality of meshes in the light receiving section using a light receiving surface divided at equal distances and a time axis divided at equal distances.

3. The imaging device according to claim 2, wherein:
each mesh has two values of logic 1 and logic 0,
each of the sensing circuits determines whether or not one or more photons have been incident on each mesh and determines 1 when there is an incidence regardless of the number of incident photons and determines 0 when there is no incidence, and
the determination result integration circuit section counts a sum of 1 of each sensing circuit.

4. The imaging device according to claim 1, further comprising a plurality of pixel blocks formed in the pixel array section, each pixel block (i) including a respective plurality of pixels, and (ii) connecting to the sensing circuit.

5. The imaging device according to claim 4, wherein:
the pixel block further includes a selection element configured to (i) select the pixels in the pixel block in a cyclic manner, and (ii) output a signal of a selected pixel to the sensing circuit, and
the sensing circuit is configured to determine whether or not there is an incidence of a photon on each selected pixel in a fixed period from a last selection to a current selection.

6. The imaging device according to claim 5, wherein:
each pixel includes a reset element configured to reset the pixel to a state in which a photon is not incident, and
the imaging device further comprises an adjustment element configured to adjust an exposure period such that an exposure time for each pixel in the pixel block is fixed.

7. The imaging device according to claim 1, wherein the determination result integration circuit section further includes a memory configured to store a count result generated for each pixel by the counting circuit.

8. The imaging device according to claim 1,
wherein:
in the pixel array section, the plurality of pixels are arrayed in a matrix, and
the determination result integration circuit section outputs an addition value of photon incidence in each row.

9. The imaging device according to claim 8,
wherein the determination result integration circuit section includes:
at least one register section including at least one line buffer which holds and outputs the determination value of the sensing circuit for each row;
a bus through which output data of the line buffer is transmitted; and
a counting circuit which performs count processing for integrating determination result data of the sensing circuit transmitted through the bus.

10. The imaging device according to claim 9, wherein:
in the sensing circuit section, sensing circuits of a plurality of lines which perform determination regarding reading of a plurality of pixels are disposed in each column, and
the determination result integration circuit section reads determination values of the sensing circuits of the plurality of lines in each column while shifting time and holds the determination values in the register section, and transmits data of the plurality of lines stored in the register section through the bus.

11. The imaging device according to claim 1, wherein:
a reset function of resetting each of the pixels to a state where a photon is not incident is set, and
the sensing circuit executes the binary determination by reading a signal in a reset state and a read signal after exposure and adding an offset value to either one of the reset state and the read signal and comparing a signal obtained by addition of the offset value with the other signal.

12. The imaging device according to claim 1,
wherein a plurality of circuit blocks, each of which includes the pixel array section, the sensing circuit section, and the determination result integration circuit section, are disposed linearly or in an array.

* * * * *